US008001573B2

(12) United States Patent
Sakao et al.

(10) Patent No.: US 8,001,573 B2
(45) Date of Patent: Aug. 16, 2011

(54) INFORMATION-PROCESSING SYSTEM, INFORMATION-PROCESSING APPARATUS, AND INFORMATION-PROCESSING METHOD

(75) Inventors: Katsutoshi Sakao, Kanagawa (JP); Satoru Maeda, Kanagawa (JP); Manabu Onishi, Tokyo (JP)

(73) Assignee: Sony Corporation, Tokyo (JP)

( * ) Notice: Subject to any disclaimer, the term of this patent is extended or adjusted under 35 U.S.C. 154(b) by 470 days.

(21) Appl. No.: 11/403,286

(22) Filed: Apr. 13, 2006

(65) Prior Publication Data

US 2006/0190971 A1 Aug. 24, 2006

Related U.S. Application Data

(63) Continuation of application No. 10/514,971, filed as application No. PCT/JP03/06200 on May 19, 2003.

(30) Foreign Application Priority Data

May 20, 2002 (JP) ................................. 2002-145319

(51) Int. Cl.
*H04N 7/18* (2006.01)
(52) U.S. Cl. ........................ 725/78; 725/80; 348/734
(58) Field of Classification Search .................... None
See application file for complete search history.

(56) References Cited

U.S. PATENT DOCUMENTS

| 5,410,326 | A | | 4/1995 | Goldstein |
|---|---|---|---|---|
| 5,648,813 | A | | 7/1997 | Tanigawa et al. |
| 6,104,334 | A | * | 8/2000 | Allport ........................ 348/734 |
| 6,130,726 | A | * | 10/2000 | Darbee et al. ................ 348/734 |
| 6,219,839 | B1 | * | 4/2001 | Sampsell ........................ 725/40 |
| 6,263,503 | B1 | * | 7/2001 | Margulis ........................ 725/81 |
| 6,344,817 | B1 | | 2/2002 | Verzulli |
| 6,437,836 | B1 | * | 8/2002 | Huang et al. ................. 725/131 |
| 6,466,233 | B1 | | 10/2002 | Mitani |
| 6,567,984 | B1 | * | 5/2003 | Allport ........................ 725/110 |
| 6,636,273 | B1 | * | 10/2003 | Weber ........................ 348/734 |
| 7,293,277 | B1 | * | 11/2007 | Nathan ........................ 725/78 |
| 2001/0009424 | A1 | * | 7/2001 | Sekiguchi ..................... 345/740 |
| 2002/0010925 | A1 | * | 1/2002 | Kikinis ........................ 725/39 |
| 2002/0036721 | A1 | | 3/2002 | Sato |
| 2002/0149705 | A1 | * | 10/2002 | Allen et al. ................... 348/734 |
| 2003/0005445 | A1 | * | 1/2003 | Schein et al. .................. 725/51 |
| 2003/0011718 | A1 | * | 1/2003 | Clapper ........................ 348/734 |

(Continued)

FOREIGN PATENT DOCUMENTS

CN 1166122 11/1997

(Continued)

*Primary Examiner* — Brian T Pendleton
*Assistant Examiner* — Dika C. Okeke
(74) *Attorney, Agent, or Firm* — Frommer Lawrence & Haug LLP; William S. Frommer

(57) ABSTRACT

In an information-processing system shown in FIG. 1, a server (106) for delivering remote-operation control information in accordance with an audio/video instrument (110) and an information-processing apparatus (103) with a remote-operation screen display function for remote-controlling the audio/video instrument (110) based on control information acquired from this server (106) are connected to each other through the Internet (105) etc. The information-processing apparatus (103) makes a request to the server (106) to deliver the remote-operation control information in accordance with this audio/video instrument (110) and, based on the control information delivered from the server (106) owing to this delivery request, performs display processing of a remote-operation screen and, based on remote-operation information input by operations on the remote-operation screen, remote-controls the audio/video instrument (110).

3 Claims, 12 Drawing Sheets

U.S. PATENT DOCUMENTS

| | | | |
|---|---|---|---|
| 2003/0066080 A1* | 4/2003 | Kamieniecki | 725/80 |
| 2003/0189509 A1* | 10/2003 | Hayes et al. | 341/176 |
| 2005/0005288 A1* | 1/2005 | Novak | 348/734 |
| 2006/0087595 A1* | 4/2006 | Kim | 348/734 |
| 2007/0296552 A1* | 12/2007 | Huang et al. | 340/10.5 |

FOREIGN PATENT DOCUMENTS

| | | |
|---|---|---|
| CN | 1271829 | 11/2000 |
| EP | 0 805 594 | 11/1997 |
| EP | 1 041 860 | 10/2000 |
| JP | 06-141198 | 5/1994 |
| JP | 07-075030 | 3/1995 |
| JP | 07-336778 | 12/1995 |
| JP | 09-74498 | 3/1997 |
| JP | 09-298677 | 11/1997 |
| JP | 9-298775 | 11/1997 |
| JP | 11-88965 | 3/1999 |
| JP | 2000-251456 | 9/2000 |
| JP | 2000-356350 | 12/2000 |
| JP | 2001-160927 | 6/2001 |
| JP | 2002-78036 | 3/2002 |
| WO | WO 00 59212 | 10/2000 |

* cited by examiner

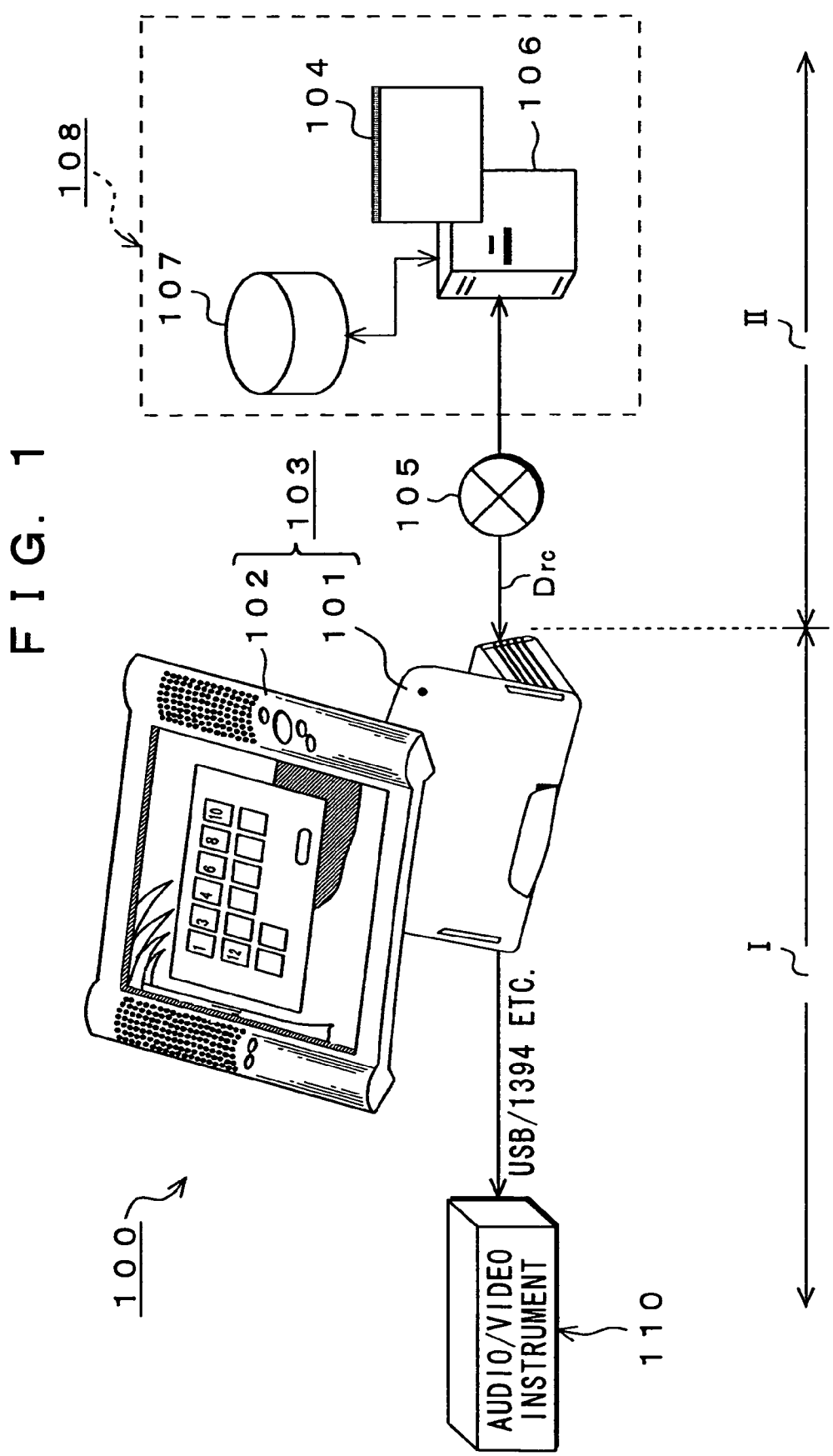

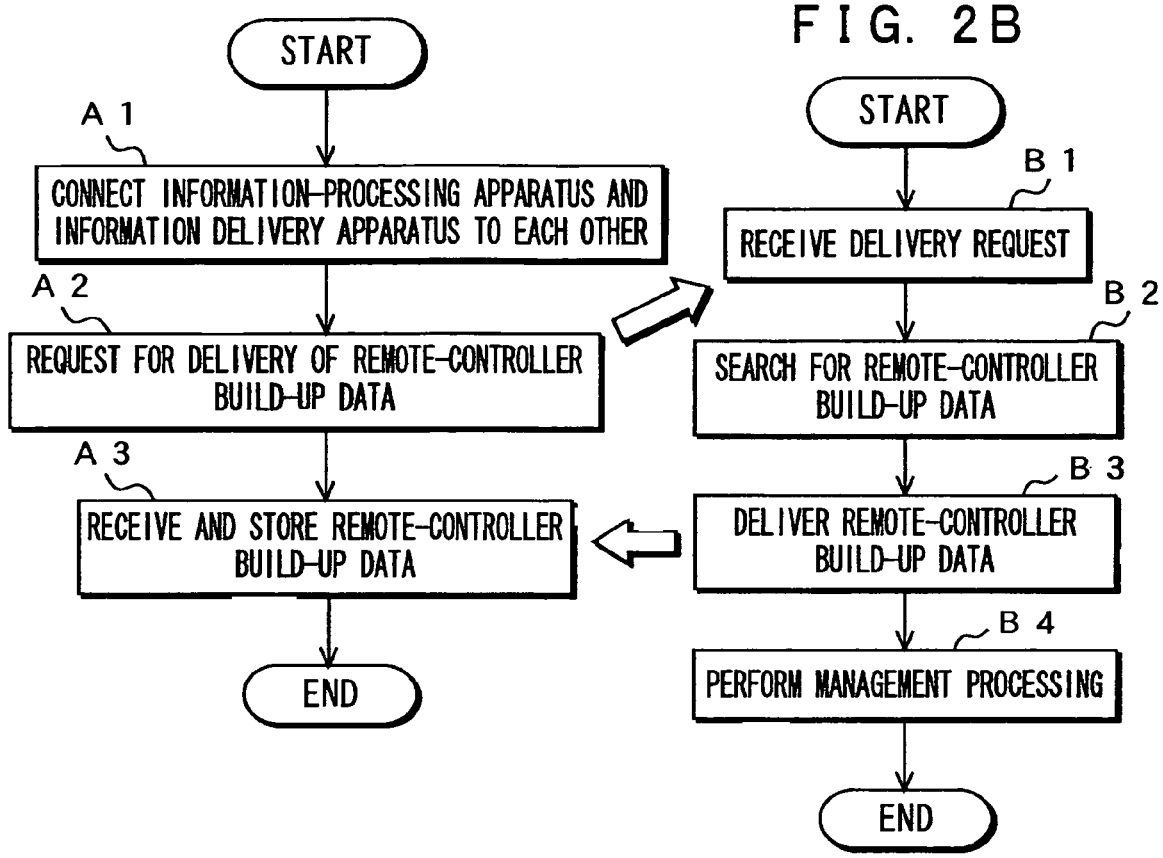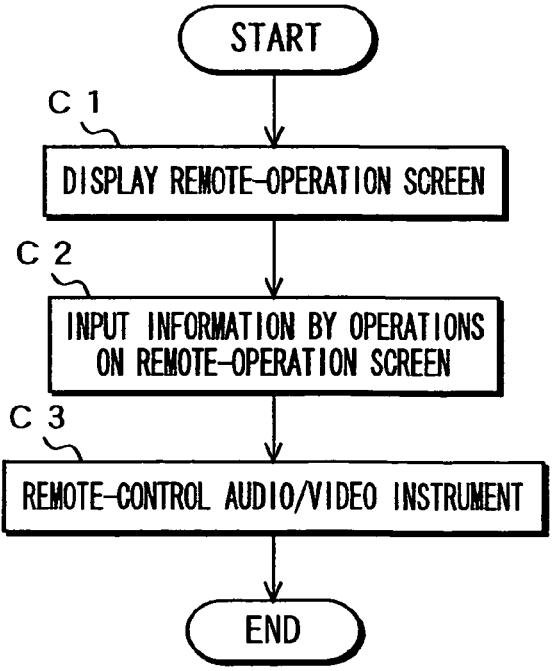

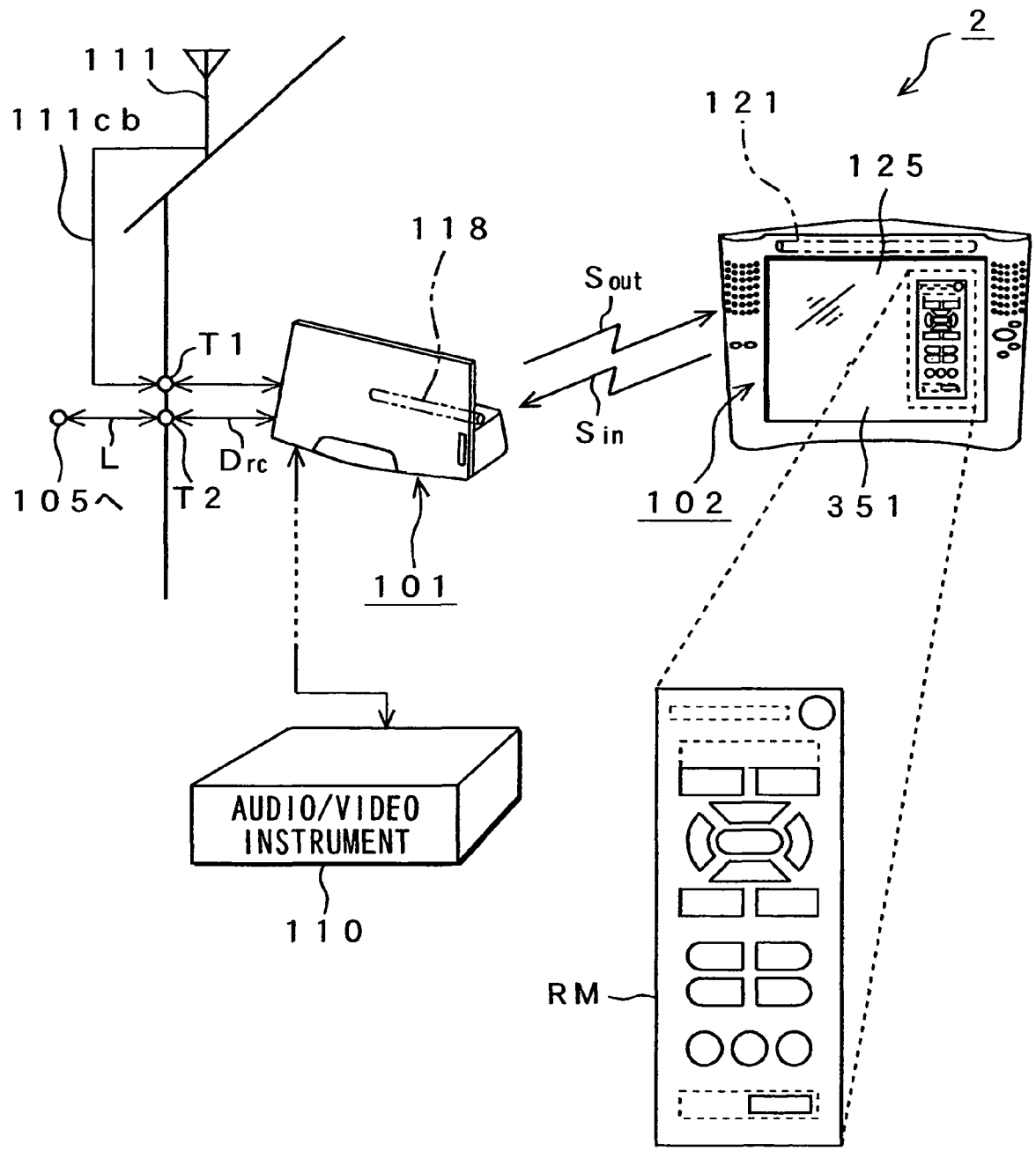

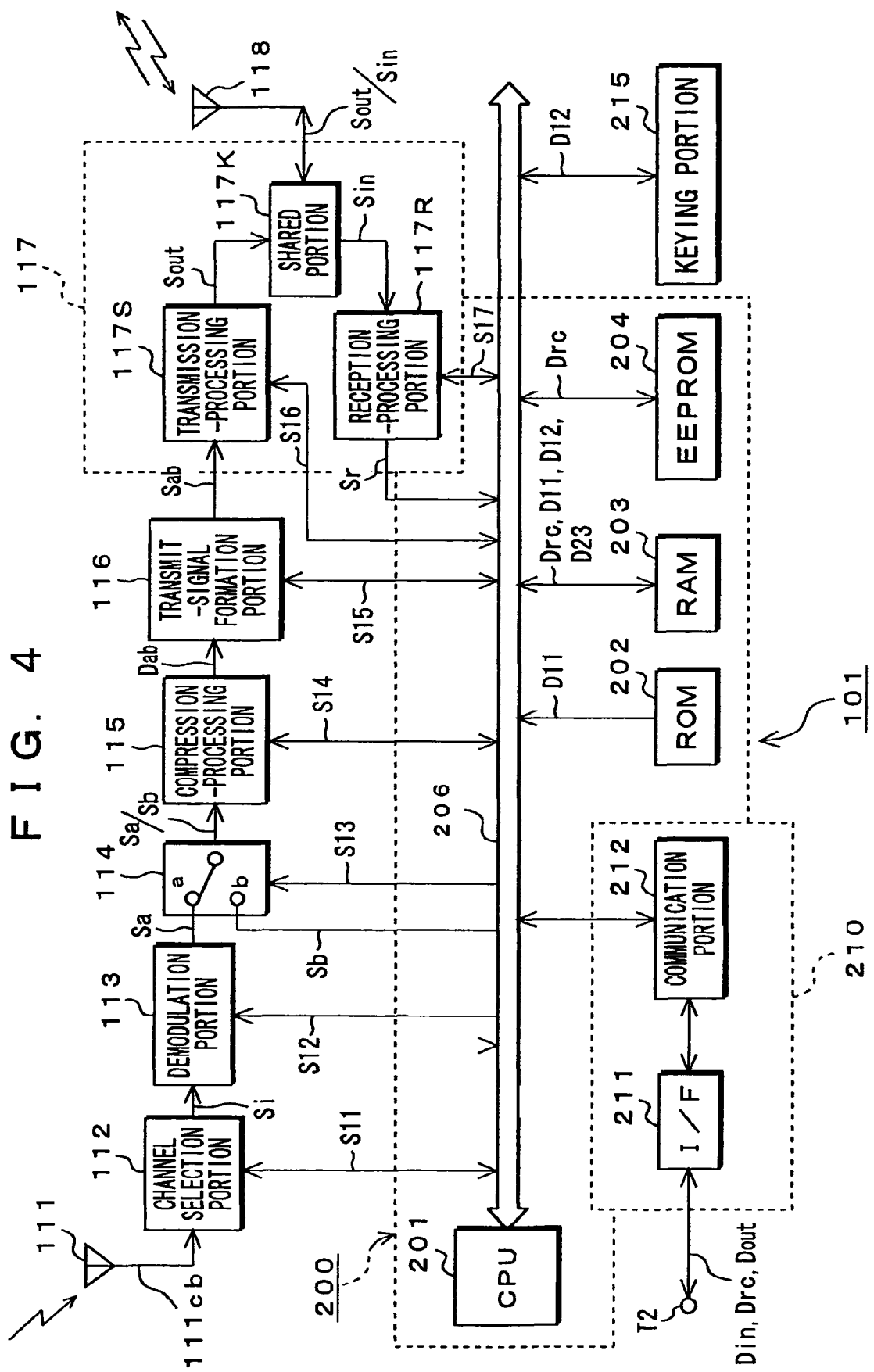

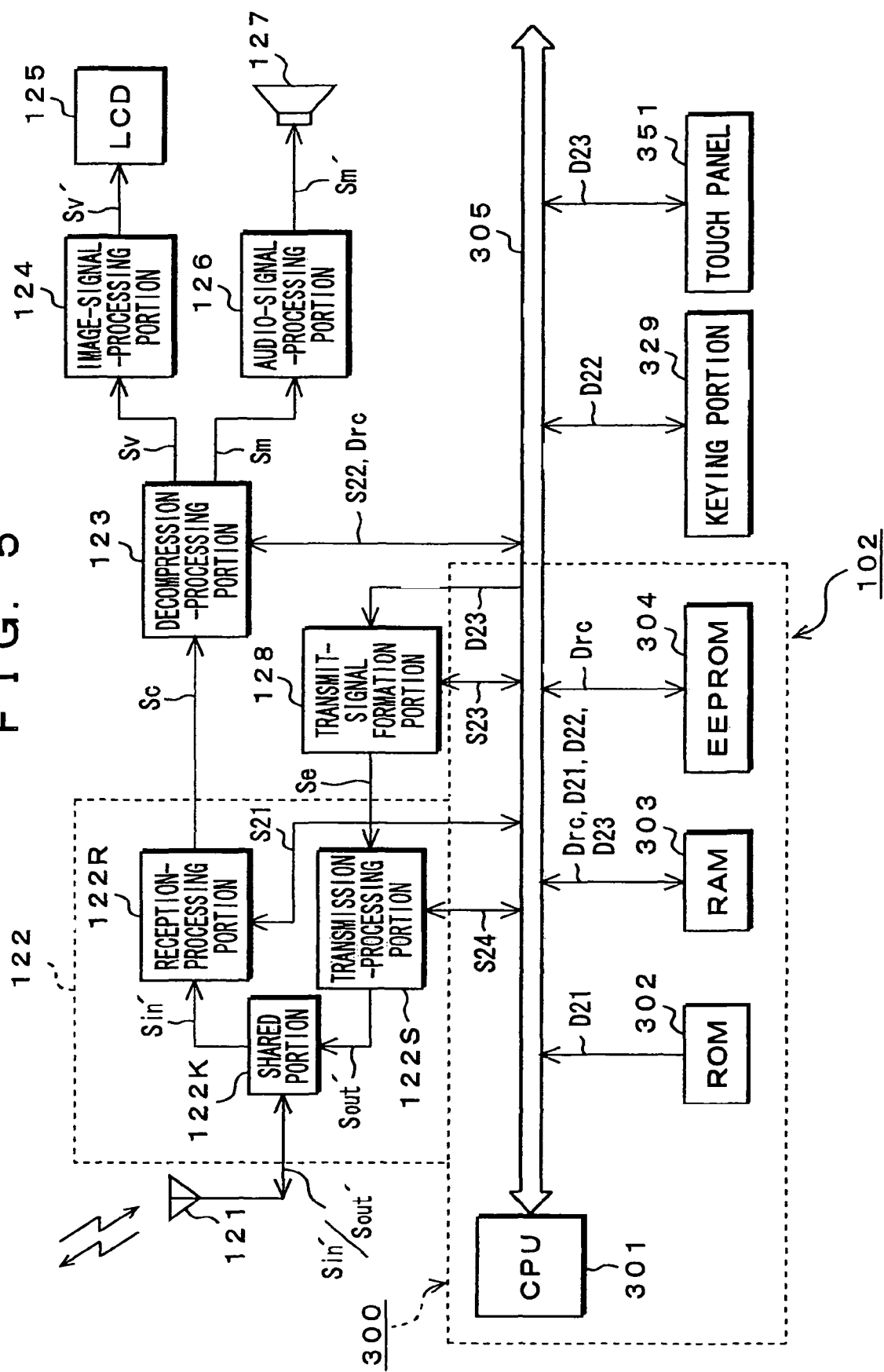

INFORMATION-PROCESSING SYSTEM, INFORMATION-PROCESSING APPARATUS, AND INFORMATION-PROCESSING METHOD

This is a continuation of application Ser. No. 10/514,971, filed Nov. 18, 2004, which is based on International Application PCT/JP03/06200, filed May 19, 2003, pursuant to 35 USC 371, and entitled to the priority filing date of Japanese application 2002-145319, filed in Japan on May 20, 2002, the entirety of which is incorporated herein by reference.

TECHNICAL FIELD

The present invention relates to an information-processing system, an information-processing apparatus, and an information-processing method, which are well applicable to a multi-functional remote-controller service system etc. for delivering remote-operation control information in accordance with audio/video instruments such as a digital CS/BS tuner, a DVD player, and a CD/MD player, and a variety of electronic instruments such as an air conditioner and a cooler. More specifically, through communication means are interconnected a server for delivering remote-operation control information in accordance with such the variety of electronic instruments and an information-processing apparatus with a remote-operation screen display function for remote-controlling these electronic instruments. The information-processing apparatus displays a remote-operation screen based on control information delivered from the server. The information-processing apparatus remote-controls the electronic instruments based on the remote-operation information input by operations on this remote-operation screen. Thus, it is possible to easily acquire remote-operation control information for a newly added electronic instrument from an information delivery apparatus and build up a multi-functional remote-controller service system that can centrally remote-operate a plurality of electronic instruments in a house etc. using an information-processing apparatus.

BACKGROUND ART

Digital information technologies have been improved recently to give many audio/video instruments such as a digital CS/BS tuner, a DVD player, and a CD/MD player, that can be remote-operated with a remote controller. The electronic instruments that can be remote-operated with a remote controller include audio/video instruments as well as electronic instruments such as an air conditioner and a cooler. This type of remote controller is provided to each of the various electronic instruments so that each of them can be remote-operated with it.

On the other hand, the Internet has progressed to enable various kinds of network services to be received. To receive this type of network services, generally a user is registered to an information provider (hereinafter referred to as an "information delivery system" also) beforehand, authenticated individually when being provided with a service, and makes a payment when he or she finishes downloading etc. In a case where the user registers to this information provider user's name, address, birth date, bank account number, etc. (user registration) to acquire an ID number so that he or she may be provided with network services, he or she enters the ID number to be authenticated.

By the way, in the case of remote controller-operable electronic instruments related to a conventional embodiment, since a remote controller is provided to each of the various electronic instruments, when an electronic instrument is added newly, although a user who is skilled in handling of them may be dealt with them, a user who is not skilled in handling of them may be expected to get at a loss in deciding correspondence between each of the remote controllers and each of the electronic instruments. Therefore, if more and more electronic instruments are used in a house, such a problem occurs that the user who does not get accustomed to resultantly many remote controllers may find it difficult to use them. In this connection, a method may be possible for unifying the remote controllers by realizing them in software (hereinafter referred to as an "information-processing system"), in which case, however, management of the application program may be expected to be complicated.

DISCLOSURE OF THE INVENTION

An information-processing system related to the present invention is a system for delivering and processing remote-operation control information in accordance with an arbitrary electronic instrument, the system comprising an information delivery apparatus for delivering remote-operation control information in accordance with the electronic instrument, an information-processing apparatus with a remote-operation screen display function for remote-controlling the electronic instrument based on the control information acquired from this information delivery apparatus, and communication means for connecting the information delivery apparatus and the information-processing apparatus to each other. The information-processing apparatus makes a request to the information delivery apparatus to deliver remote-operation control information in accordance with this electronic instrument and, based on the control information delivered from the information delivery apparatus owing to this delivery request, performs display processing of a remote-operation screen. The information-processing apparatus features remote control of the electronic instrument based on remote-operation information input by operation on a remote-operation screen.

According to the information-processing system related to the present invention, to deliver and process remote-operation control information in accordance with an arbitrary electronic instrument, the information-processing apparatus with the remote-operation screen display function makes a request to the information delivery apparatus to deliver remote-operation control information in accordance with this electronic instrument. In this case, this information delivery apparatus and the information-processing apparatus are connected to each other by communication means. As the communication means, for example, a broadcasting platform, a public telephone circuit, a private communication line, and/or the Internet are used.

Based on this assumption, when having received a delivery request, the information delivery apparatus delivers to the information-processing apparatus remote-operation control information in accordance with this electronic instrument. The information-processing apparatus performs display processing of the remote-operation screen based on the control information acquired from the information delivery apparatus. In this case, the remote-operation control information is stored in a nonvolatile memory etc. Then, the information-processing apparatus remote-controls the electronic instrument(s) based on remote-operation information input by operation(s) on the remote-operation screen. Therefore, it is possible to easily acquire from the information delivery apparatus remote-operation control information even for a newly added electronic instrument. It is thus possible to remote-control even a newly added electronic instrument based on remote-operation information input by operation(s) on the remote-operation screen. Therefore, a multi-functional remote-controller service system can be built up which can centrally remote-operate a plurality of electronic instruments in a house etc. using one information-processing apparatus.

An information-processing apparatus related to the present invention is a information-processing apparatus for receiving remote-operation control information in accordance with an arbitrary electronic instrument from an information delivery system to thereby remote-control this electronic instrument, the apparatus comprising delivery requesting means for making a request to the information delivery system to deliver remote-operation control information in accordance with this electronic instrument, touch-panel type display means for displaying a remote-operation screen based on the control information received by this delivery requesting means from the information delivery system, and a control unit for remote-controlling the electronic instrument based on remote-operation information input by operation on the remote-operation screen displayed on this display means.

According to the information-processing apparatus related to the present invention, to receive from the information delivery system the remote-operation control information in accordance with an arbitrary electronic instrument to thereby remote-control this electronic instrument, the delivery requesting means is used to request the information delivery system to deliver remote-operation control information in accordance with this electronic instrument. Then, the display means displays the remote-operation screen based on the control information received by the delivery requesting means from the information delivery system. The control unit remote-controls the electronic instrument(s) based on remote-operation information input by operation(s) on the remote-operation screen displayed on the touch-panel type display means.

Therefore, it is possible to easily acquire the remote-operation control information for a newly added electronic instrument from the information delivery system. On top of that, it is possible to remote-control even a newly added electronic instrument based on the remote-operation information input by operation(s) on the remote-operation screen. It greatly contributes to build-up of a multi-functional remote-controller service system that can centrally remote-operate a plurality of electronic instruments in a house etc. using this one information-processing apparatus.

An information-processing method related to the present invention is a method for delivering remote-operation control information in accordance with an arbitrary electronic instrument, the method comprising a step of, to acquire the remote-operation control information in accordance with the electronic instrument, first interconnecting through communication means an information delivery system for delivering the remote-operation control information and an information-processing system with a remote-operation screen display function for remote-controlling the electronic instrument. Next, the information delivery system is requested to deliver the remote-operation control information in accordance with this electronic instrument and then the information delivery system thus requested to deliver delivers the control information to the information-processing system. Then, to remote-control the electronic instrument, a remote-operation screen is displayed on the basis of the control information delivered beforehand, and remote-operation-information is input by operation on the remote-operation screen thus displayed.

According to the information-processing method related to the present invention, when delivering and processing remote-operation control information in accordance with an arbitrary electronic instrument, it is possible to easily acquire from the information delivery apparatus remote-operation control information even for a newly added electronic instrument. It is thus possible to remote-control even a newly added electronic instrument based on the remote-operation information input by operations on the remote-operation screen. Therefore, a multi-functional remote-controller service system can be built up which can centrally remote-operate a plurality of electronic instruments in a house etc. using one information-processing apparatus.

BRIEF DESCRIPTION OF THE DRAWINGS

FIG. 1 is a block diagram for showing a configuration of a remote-controller build-up information-processing system 100 to which an information-processing system according to an embodiment of the present invention is applied;

FIG. 2A is a flowchart for showing an example of requesting for delivery of remote-controller build-up data in an information-processing system I;

FIG. 2B is a flowchart for showing an example of requesting for delivery of the remote-controller build-up data in an information-processing system II;

FIG. 2C is a flowchart for showing an example of remote operation in the information-processing system I;

FIG. 3 shows a configuration of an information-processing system with a TV reception function on the side of a user;

FIG. 4 is a block diagram for showing an internal configuration of a base station 101;

FIG. 5 is a block diagram for showing an internal configuration of a display unit 102;

BEST MODE FOR CARRYING OUT THE INVENTION

Figure 6:
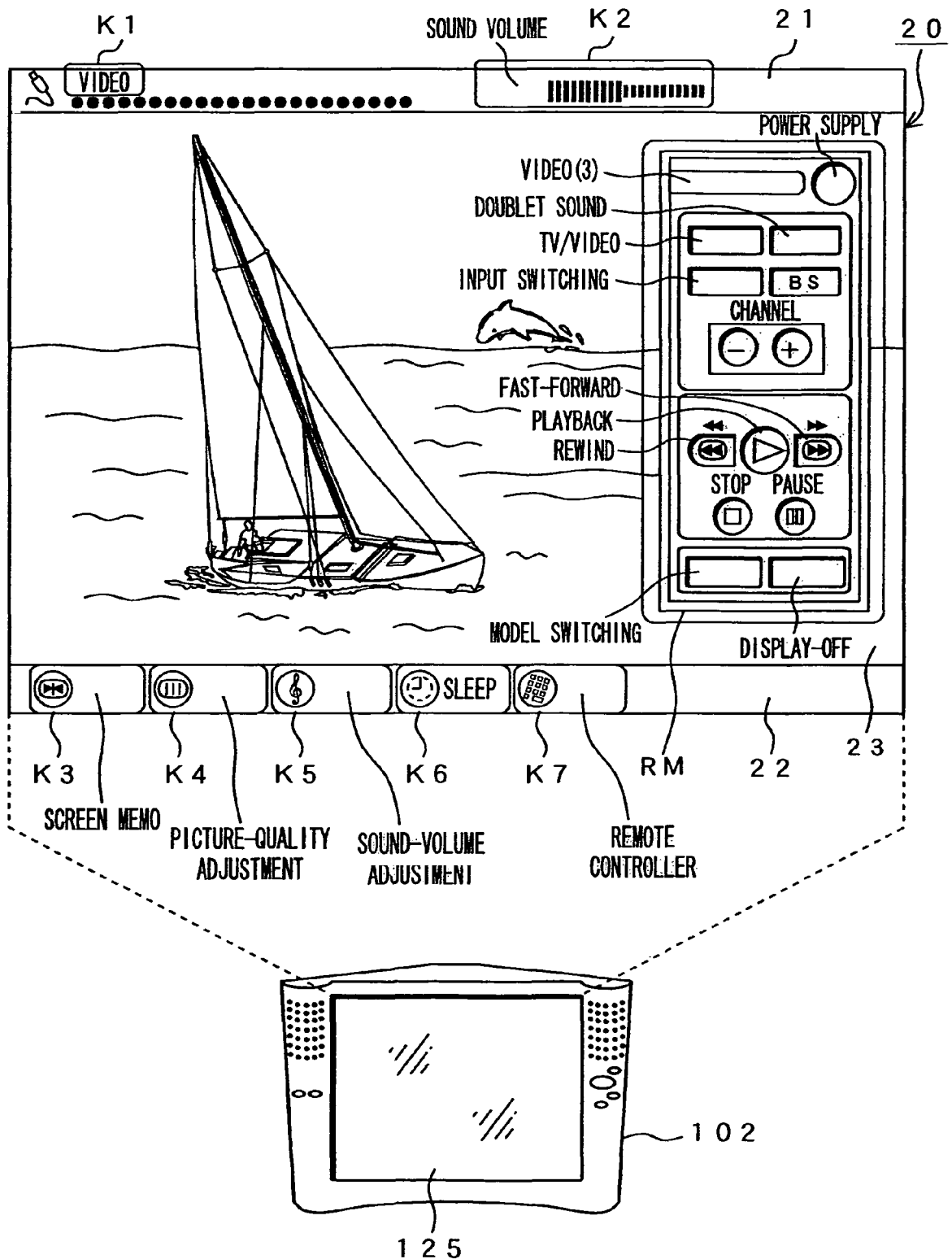
FIG. 6 shows a display example of a remote controller RM on an LCD portion 125.

It is an object of the present invention to provide an information-processing system, an information-processing apparatus, and an information-processing method, which enable to be easily acquired from an information delivery system remote-operation control information for a newly added electronic instrument and may build up a remote-control system that can centrally remote-operate a plurality of electronic instruments in a house etc. using one information-processing system.

The following will describe one embodiment of each of the information-processing system, the information-processing apparatus, and the information-processing method related to the present invention with reference to drawings. According to the present embodiment, a remote-controller build-up information-processing system 100, which is one example of the information-processing system, is constituted, and an information delivery apparatus that delivers remote-operation control information in accordance with an arbitrary electronic instrument and an information-processing apparatus with a remote-operation screen display function for remote-controlling this electronic instrument are connected to each other through communication means. Then, the information-processing apparatus displays a remote-operation screen based on control information delivered from the information delivery apparatus, to remote-control the electronic instrument based on the remote-operation information input by operations on this remote-operation screen. Thus, it is possible to easily acquire from an information delivery apparatus remote-operation control information for a newly added electronic instrument and build up a multi-functional remote-controller service system that can centrally remote-operate a plurality of electronic instruments in a house etc. using one information-processing apparatus.

The remote-controller build-up information-processing system 100 shown in FIG. 1 delivers and processes remote-operation control information in accordance with an arbitrary electronic instrument. This system 100 is well applicable to a multi-functional remote-controller service system for delivering remote-operation control information in accordance with audio/video instruments such as a digital CS/BS tuner, a DVD player, and a CD/MD player and a variety of electronic instruments such as an air conditioner and a cooler (hereinafter referred to as "audio/video instruments 110 etc." generically).

In this remote-controller build-up information-processing system 100, an information delivery apparatus 108 is provided on the side of an information provider. The information delivery apparatus 108 is constituted of, for example, a server 106, a database 107, and an application 104. The server 106 delivers remote-operation control information (hereinafter referred to as "remote-controller build-up data Drc") in accordance with the above-described audio/video instruments 100 etc. On the side of an information user (hereinafter referred to as a "user"), an information-processing apparatus 103 with a remote-operation screen display function is provided. Remote-controller build-up data Drc refers to data that combines display information for displaying an image schematically expressing a remote controller RM on a display screen of the information-processing apparatus 103 and remote-operation information input by operations on the remote controller RM displayed on this display screen.

Control information contains remote-controller build-up data Drc as well as a user interface, data such as a manual, and an application 104 such as a control program. The server 106 individually manages services for delivering remote-controller build-up data Drc to the user's information-processing apparatus 103 as a target. The purpose thereof is to smoothly perform accounting processing for the user. This server 106 is connected to the database 107. Every time a new audio/video instrument 110 etc. is manufactured, remote-controller build-up data Drc in accordance with this audio/video instrument 110 is stored in the database 107.

The purpose thereof is to accommodate a service of delivering the remote-controller build-up data Drc in accordance with the new audio/video instrument 110 etc. The database 107 is operated so that a manufacturer/model name can be selected, in which the application 104 such as remote-controller build-up data Drc is managed in a secure environment. As the application software, a printer driver etc. may be enumerated.

To perform a delivery service of remote-controller build-up data Drc in this system 100, the server 106 performs accounting processing in response to payment by this information-processing system 100. In this payment processing, an ID card such as a magnetic card or an electronic card is used. The purpose thereof is to manage accounting processing pieces individually. The server 106 automatically withdraws a fee from a bank account of the user. This allows to realize a dedicated service or a versatile service in response to payment by use of an ID card.

Further, the information-processing apparatus 103 provided on the side of the user remote-controls the audio/video instrument 110 etc. based on the remote-controller build-up data Drc acquired from the server 106. As the information-processing apparatus 103, a target instrument "Air-board®" (Sony Co.: registered trademark) is used, which can be connected to the Internet and receive satellite data broadcasts etc. This kind of target instrument constitutes the information-processing apparatus 103 with a TV broadcast reception function and is comprised of a stationary type base station (channel selection apparatus) 101 and a portable terminal-unit type display unit 102. This information-processing apparatus 103 can be transmitted in a condition where the display unit 102 is separated from the base station 101. Preferably, this display unit 102 is equipped with a touch panel. It is done so in order to perform an input operation by touching the remote controller displayed on the display unit 102 by a finger. Remote-operation information obtained by this input operation on the remote controller is output to the base station 101. This base station 101 transmits the remote-operation information to the electronic instrument so that it may be remote-operated.

To acquire the remote-controller build-up data Drc by this information-processing apparatus 103, the server 106 and this base station 101 are connected to each other through communication means. The purpose thereof is to request the server 106 to deliver remote-controller build-up data Drc in accordance with this audio/video instrument 110 etc. In the present embodiment, as the communication means, the Internet 105, a broadcast platform, a public telephone circuit, a dedicated communication line, etc. is used.

In this remote-controller build-up information-processing system 100, the base station 101 requests the server 106 to deliver remote-controller build-up data Drc in accordance with this audio/video instrument 110 etc. By this delivery requesting processing, the information-processing apparatus 103 receives (downloads) the remote-control build-up data Drc from the server 106. The remote-controller build-up data Drc downloaded from the server 106 is stored, for example, in a nonvolatile memory provided to the base station 101 or the display unit 102. If a new audio/video instrument 110 etc. is added, further remote-controller build-up data Drc in accordance with this audio/video instrument 110 is downloaded and added thereto. Based on this remote-controller build-up data Drc, the display unit 102 performs display processing on the remote-operation screen and the remote-operation information is input by operations on the remote-operation screen. This remote-operation information is transferred to the base station 101. The base station 101 remote-controls the audio/video instrument 110 etc. based on the remote-operation information input by operations on the display unit 102.

In this remote-controller buildup information-processing system 100, the audio/video instrument 110 etc. and the base station 101 are connected to each other by a wired scheme or a wireless scheme. In the case of the wired scheme, they are connected to an interface in accordance with the communication standards such as IEEE1394, USB, etc. through a communication cable in accordance with these standards. Of course, the possible scheme is not limited to it; for example, such an optical communication path may be established that the audio/video instrument 110 etc. and the base station 101 are interconnected by an infrared scheme. Any connection scheme may be employed as far as the audio/video instrument 110 etc. can be remote-controlled on the basis of remote-controller build-up data Drc.

It is to be noted that the stationary type base station 101 that remote-controls the audio/video instrument 110 etc. and the display unit 102 with the remote-operation screen display function constitute the information-processing system I, while the server 106 that delivers the remote-controller build-up data Drc to the base station 101, the database 107, and the application 104 constitute the information delivery system II.

The following will describe an information-processing method related to the present invention. FIG. 2A is a flowchart for showing an example of requesting for delivery of remote-controller build-up data in the information-processing system I; FIG. 2B is a flowchart for showing an example of requesting for delivery of the remote-controller build-up data in the information-processing system II; and FIG. 2C is a flowchart for showing an example of remote operation in the information-processing system I.

In this remote-controller build-up information-processing system 100, such a case is assumed that remote-controller build-up data Drc in accordance with an arbitrary audio/video instrument 110 etc. is delivered and processed. In the information-processing system I, for example, the information-processing apparatus 103 is provided which is constituted of the stationary type base station 101 and the display unit 102 with the remote-operation screen display function. In the information delivery system II, the information delivery apparatus 108 is provided which is constituted of the server 106, the database 107, and the application 104.

Under these information-processing conditions, when a user acquires remote-controller build-up data Drc in accordance with an audio/video instrument 110 etc., the server 106 in the information delivery system II for delivering the remote-controller build-up data Drc and the base station 101 in the information-processing system I are connected to each other by the Internet 105, which is one example of communication means, at step A1 of the flowchart shown in FIG. 2A. The communication means is not limited to the Internet 105; for example, a broadcast platform, a public telephone circuit, a dedicated communication line, etc. may be used according to the information-processing system 100.

Then, the process goes to step A2 where the user requests the server 106 to deliver the remote-controller build-up data Drc in accordance with this audio/video instrument 110 etc. In this case, in the information delivery system II, the audio/video instrument 110 etc. or the user may be authenticated. To perform this authentication processing, preferably key information is incorporated in manufacturer's serial number information etc. of the audio/video instrument 110 beforehand. In such a manner, a target instrument can be identified through the key information, so that the remote-controller build-up data Drc of this identified target instrument can be delivered properly.

Further, the information delivery system II receives this delivery request at step B1 of the flowchart shown in FIG. 2B. At step B2, it searches for remote-controller build-up data Drc of the audio/video instrument 110 etc. on which a delivery request is made. Then, at step B3, the information delivery system II delivers the remote-controller build-up data Drc to the information-processing system I which has requested for delivery. Then, the process goes to step B4 where the information delivery system II manages customers concerning this information-processing system 100. This customer management is performed to know a current utilization condition, thereby improving future services.

For example, the server 106 individually manages delivery services of remote-controller build-up data Drc provided to the information-processing system I as a target. In this case, the server 106 performs account processing in response to payment for the delivered service for each of the users. Further, the information delivery system II can know a model etc. of an audio/video instrument 110 the user bought, from a delivery request for the remote-controller build-up data Drc. The purpose thereof is to develop potential popular goods in the future and improve delivery services of the remote-controller build-up data Drc.

The information-processing system I, on the other hand, receives (downloads) the remote-controller build-up data Drc from the server 106 at step A3 of the flowchart shown in FIG. 2A. The remote-controller build-up data Drc downloaded from the server 106 is stored, for example, in the nonvolatile memory provided to the base station 101 or the display unit 102. It is to be noted that if a new audio/video instrument 110 etc. is added, further its remote controller build-up data Drc is downloaded and added.

Further, to remote-control the audio/video instrument 110 etc. in the information-processing system I, at step C1 of the flowchart shown in FIG. 2C, the display unit 102 reads the remote-controller build-up data Drc from the memory through the base station 101 and displays the remote-operation screen. In this case, the remote-operation screen can be displayed on the display unit 102 even if it is separated from the base station 101.

Then, at step C2, the display unit 102 is operated so that the touch panel is operated on the remote-operation screen to input remote-operation information. This remote-operation information is output from the display unit 102 to the base station 101. At step C3, the base station 101 remote-controls the audio/video instrument 110 etc. based on the remote-operation information received from the display unit 102. The audio/video instrument 110 etc. behaves based on the remote-operation information received from the base station 101.

Therefore, it is possible to easily acquire from the server 106 remote-controller build-up data Drc even for a newly added audio/video instrument 110 etc. It is thus possible to remote-control even the newly audio/video instrument 110 etc. based on remote-operation information input by operations on the remote-operation screen. Therefore, a multi-functional remote-controller service system can be built up which can centrally remote-operate a plurality of audio/video instruments 110 etc. in a house etc. using the information-processing apparatus 103 constituted of the base station 101 and the display unit 102.

The following will describe a configuration of a TV reception system applied to this remote-controller build-up information-processing system 100. A TV reception system shown in FIG. 3 comprises the information-processing apparatus 103 constituted of the base station 101 and the display unit 102. The base station 101 receives the remote-controller build-up data Drc in accordance with an arbitrary audio/video instrument 110 etc. from the information delivery system II, to remote-control this audio/video instrument 110 etc. Furthermore, the base station 101 and the display unit 102 constitute a TV reception system and are connected to each other through wireless communication, one pair of which constitutes the information-processing apparatus 103.

The audio/video instrument 110 etc. that the user intends to remote-control is connected to the base station 101 through an interface in accordance with the standards such as IEEE1394 or USB. Of course, the possible connection scheme is not limited to it; for example, the audio/video instrument 110 etc. and the base station 101 may be connected to each other by an infrared scheme (by use of an audio/video mouse etc.) optically. An audio/video mouse refers to a device for emitting control light such as infrared light from the base station 101 when operating a video deck.

The base station 101 is used in a condition where it is mounted in a house, for example. Further, the display unit 102 is used near the user. This base station 101 is connected to a TV broadcast reception antenna 111 installed outdoors and connected to an antenna cable 111cb drawn from an outside to an inside of the house as well as to a telephone network and a telephone line L drawn from the outside to the inside of the house. The purpose thereof is to connect the base station 101 to the Internet so that the remote-controller build-up data Drc in accordance an arbitrary audio/video instrument 110 may be received from the information delivery system II.

This base station 101 selects a channel for a TV broadcast program received through the antenna 111 and performs wireless transmission of a transmit signal Sout obtained after reception processing of this selected channel of TV broadcast program, to the display unit 102 through a transmission/reception antenna 118. Alternatively, the base station 101 performs wireless transmission of a communication content transmitted through the telephone line L or the transmit signal Sout obtained after reception processing of remote-controller build-up data Drc received from the information delivery system II, to the display unit 102 through the transmission/reception antenna 118.

Further, the base station 101 can receive a receiving signal Sin containing instruction information or an e-mail from the display unit 102 through the transmission/reception antenna 118, to change a selected channel of TV broadcast program in accordance with the received instruction information or transmit communication information to a partner's terminal unit through the telephone line L.

The display unit 102 receives the signal Sout though wireless transmission from the base station 101 and displays an image in accordance with an image signal contained in the transmit signal Sout on a display screen of a liquid crystal display portion 125, which is one example of display means. In the present embodiment, display processing of the remote-operation screen is performed on the display unit 102 based on the remote-controller build-up data Drc, to select remote-operation information by keying on the remote controller on this remote-operation screen.

The remote-operation information is thus selected on this remote-operation screen in order to remote-control the audio/video instrument 110 etc. from the base station 101 based on the remote-operation information thus selected. Besides, the display unit 102 produces sound due to an audio signal contained in the received signal Sout through a speaker, thereby enabling a TV broadcast program to be viewed.

Further, the display unit 102 wirelessly receives communication information such as an e-mail or a homepage on the Internet 105, which has been received through the telephone line L and processed by the base station 101, forms a display signal from the signal Sout thus received, and displays an image in accordance with this display signal on the liquid crystal display portion 125 and provides it to the user.

Furthermore, a touch panel 351 is stuck to the display screen of the liquid crystal display portion 125 of this display unit 102, so that the display unit 102 can accept information displayed on the display screen of the liquid crystal display portion 125 and incoming information such as a variety of instructions entered by the user through the touch panel 351. The display unit 102 thus has the touch panel 351 to thereby performing various operations such as creation and transmission of an e-mail and reception and displaying of an e-mail for attention of himself or herself.

In the present embodiment, on the display screen of the display unit 102, an image schematically representing the remote controller based on the above-mentioned remote-controller build-up data Drc and an input function of the touch panel 351 are combined to build up a so-called "remote controller", so that remote-operation information is output to the base station 101 by keying on the remote controller. That is, the display unit 102 has a function as a user interface to provide the user with information taken into a TV set by the base station 101 and accept information from the user. Besides it, the display unit 102 has a remote-control function as the user interface to remote-control the audio/video instrument 110 etc. This remote-control function is built up (put together) based on the remote-controller build-up data Drc downloaded from the server 106.

Further, as shown in FIG. 3, the base station 101 is preferably arranged to such a place that it can surely be connected to both a connection terminal T1 with the antenna cable 111cb and a connection terminal T2 with the telephone line L according to their positions. Preferably the base station 101 is wirelessly connected to the display unit 102 as shown in FIG. 3. By doing so, the display unit 102 can be separated from the base station 101 and carried about freely.

Therefore, the display unit 102 can be carried about anywhere in an area in which a radio signal from the base station 101 can be received, so that it is possible to, for example, view a target TV broadcast program or transmit and receive an e-mail in a condition where it is connected to the Internet 105. Furthermore, the user can remote-operate a remote DVD instrument or audio/video instrument 110 etc. such as a digital CS tuner on the remote controller on the operation screen of the display unit 102.

The following will describe internal configurations of the base station 101 and the display unit 102 individually in contents.

[Base Station]

The base station 101 shown in FIG. 4 can download the remote-controller build-up data Drc from a predetermined Web site. On top of that, the base station 101 has an interface function to take a TV broadcast signal or various kinds of information provided through the telephone line L into the TV reception system shown in FIG. 3 or send out information from this TV reception system through the telephone line L to a communication network.

Components of this base station 101 are controlled by the control unit and a control portion 200, which is one example of delivery requesting means. As shown in FIG. 4, the control portion 200 comprises a central processing unit (CPU) 201, a read only memory (ROM) 202, a random access memory (RAM) 203, and an electrically erasable programmable ROM (EEPROM) 204. These CPU201, ROM202, RAM203, and EEPROM204 are connected mutually through a CPU bus 206. The control portion 200 constitutes a microcomputer.

The control portion 200 has both a function (delivery requesting function) to request the information delivery system II described with reference to FIG. 1 to deliver the remote-controller build-up data Drc in accordance with this audio/video instrument 110 etc. and a function (remote-control function) to remote-control the audio/video instrument 110 etc., based on remote-operation information input by operations on the remote-operation screen displayed on the display unit 102. It is to be noted that the ROM202 records in it various processing programs executed at the base station 101 and data D11 required in information processing. The RAM203 is mainly used as a working space for various kinds of processing in order to, for example, temporarily hold data obtained through these kinds of processing. The RAM203 stores, for example, remote-controller build-up data Drc, the data D11, key data D12, remote-operation data D23, etc. The remote-operation data D23 is transferred from the display unit 102 to the base station 101.

The EEPROM204 is a so-called nonvolatile memory and does not lose information held in it even after its power supply is turned off, to hold information of a broadcast channel which has been selected immediately before a main power supply of the base station 101 is turned off. After the power supply is turned on, the EEPROM selects a broadcast signal of the channel selected immediately before a main power supply has last been turned off, thereby realizing a so-called last-channel memory function.

Besides information to realize the last-channel memory function, this EEPROM204 stores the remote-controller build-up data Drc delivered from the server 106. This remote-controller build-up data Drc may be stored in the display unit 102. Accordingly, it is possible to easily record in the EEPROM204 the remote-controller build-up data Drc for a newly added audio/video instrument 110 etc., also.

In the base station 101 of the present embodiment, the antenna cable 111cb from the TV broadcast reception antenna 111 installed outdoors is connected to a channel selection portion 112 of the base station 101. A TV broadcast signal Si received through this antenna 111 is supplied to the channel selection portion 112. The channel selection portion 112 selects a TV broadcast signal Si in accordance with a channel-selection instruction signal S11 from the TV broadcast signal Si received through the antenna 111 and supplies the TV broadcast signal Si thus selected to a demodulation portion 113. The channel-selection instruction signal S11 is output from the control portion 200 to the channel selection portion 112. The demodulation portion 113 demodulates the TV broadcast signal Si input from the channel selection portion 112 based on a control signal S12 and supplies a signal as demodulated (hereinafter referred to as a "TV-broadcast signal Sa") to an input terminal a of a switching circuit 114. The control signal S12 is supplied from the CPU201 to the demodulation portion 113.

The switching circuit 114 is switched under the control of a switching control signal S13 from the control portion 200 as to whether it should output the TV-program signal Sa supplied from the demodulation portion 113 to the input terminal a or a signal Sb supplied from the control portion 200 to an input terminal b. It is to be noted that the signal Sb supplied from the control portion 200 to the switching circuit 114 is, which will be described later also, an e-mail supplied through the telephone line L to the base station 101 and received through a communication MODEM portion 210 or information of a so-called homepage on the Internet 105. Of course, the signal Sb is the remote-controller build-up data Drc in accordance with an audio/video instrument 110 etc. downloaded from the information delivery system II. This is because such a case is assumed that the remote-controller build-up data Drc is stored in the memory in the display unit 102.

Further, the signal Sa or Sb output from the switching circuit 114 is supplied to a compression-processing portion 115. The compression-processing portion 115 performs data compression on the signal Sa or Sb input from the switching circuit 114 according to a predetermined compression standard. This compression-processing portion 115 uses a data compression standard such as, for example, the moving picture expert group (MPEG) standard or the Wavelet standard, to compress data of the signal Sa or Sb from the switching circuit 114. A control signal S14 is supplied from the CPU201 to the compression-processing portion 115.

Data Dab compressed at the compression-processing portion 115 is supplied to a transmit-signal formation portion 116. The transmit-signal formation portion 116 forms a transmit signal Sab which is compliant with a predetermined communication protocol. In the present embodiment, based on a control signal S15, the transmit signal Sab is formed from the data Dab, which is compliant with a protocol of the Institute of Electrical and Electronics Engineers (IEEE) standard 802.11 or its evolved protocol. The control signal S15 is supplied from the CPU201 to the transmit-signal formation portion 116.

The transmit signal Sab formed at the transmit-signal formation portion 116 is supplied to a transmission-processing portion 117S in a radio transmission/reception portion 117. The radio transmission/reception portion 117 comprises a shared portion 117K, the transmission-processing portion 117S, and a reception-processing D portion 117R. The transmission processing portion 117S modulates and amplifies the transmit signal Sab according to a control signal S16 from the control portion 200. The transmit signal Sout processed at the transmission-processing portion 117 is wirelessly transmitted to the display unit 102 through the shared portion 117K and the antenna 118.

The shared portion 117K prevents the transmit signal Sout and the receiving signal Sin from interfering with each other. That is, as described above, the base station 101 is arranged so that it can receive, through the antenna 118, instruction information wirelessly X) transmitted from the display unit 102. Therefore, the shared portion 117K prevents the transmit signal Sout from the transmission processing portion 117S from interfering with the receiving signal Sin received through the antenna 118.

The receiving signal Sin containing, for example, a channel-selecting instruction from the display unit 102 received through the antenna 118 is supplied through the shared portion 117K to the reception-processing portion 117R. The reception-processing portion 117R, based on a control signal S17, performs processing of the signal Sin received from the display unit 102, for example, demodulation of the remote-operation data D23, to generate a signal Sr that can be handled by the control portion 200 and supply this signal Sr to the control portion 200. The control signal S17 is supplied from the CPU201 to the reception-processing portion 117R.

If the signal Sr from the reception-processing portion 117R is an instruction signal containing a channel-selection instruction, the control portion 200 controls the components according to this instruction signal. Thus, in a case where the signal Sr supplied from the reception-processing portion 117R to the control portion 200 contains a channel-selection instruction, the control portion 200 supplies the channel selection portion 112 with the channel-selection instruction signal S11 in accordance with the supplied channel-selection instruction, to control the channel selection portion 112 so that the TV broadcast signal Si for channel selection may be replaced.

Further, in a case where the signal Sr supplied from the reception-processing portion 117R to the control portion 200 is transmit information such as an e-mail, the control portion 200, as described later also, connects to a telephone network through the communication MODEM portion 210 and the telephone line L and sends out the transmit information to this telephone network to transmit it to a target partner.

The communication MODEM portion 210 comprises an interface (which is written as I/F in FIG. 4) circuit 211 and a communication portion 212 as shown in FIG. 4. The I/F circuit 211 serves as an interface between a communication line connected between the partner and the base station 101 through the telephone network and this base station 101, thereby receiving data Din transmitted through the telephone network (telephone line L) and transmitting data Dout from the communication portion 21. Of course, the I/F circuit 211 receives the remote-controller build-up data Drc in accordance with an audio/video instrument 110 etc. downloaded from the information delivery system II.

The communication portion 212 demodulates the data Din received through the I/F circuit 211 or the remote-controller build-up data Drc and supplies it to the control portion 200 or modulates the data Dout from the control portion 200 and supplies it to the I/F circuit 211. It is thus possible to transmit various kinds of data Din/Dout to or receive it from the partner to which the telephone line L is connected, receive the remote-control build-up data Drc from it, and transmit key information of an audio/video instrument 110 etc. to it.

Therefore, as described above, this base station 101 is connected to the Internet 105 shown in FIG. 1 through the communication MODEM portion 210, the telephone line L, and a predetermined Internet service provider (ISP) so that it can receive various kinds of information through this Internet 105. In the present embodiment, the information delivery system II is requested to deliver the remote-controller build-up data Drc in accordance with this audio/video instrument 110 etc. so that appropriate remote controller build-up data Drc may be downloaded from the information delivery system II. Besides, the information-processing apparatus 103 is arranged so that it can transmit and receive an e-mail or chat with the partner.

For example, the control portion 200 can do off-hook or on-hook communication by controlling the communication MODEM portion 210 and has a function to send out a dial signal to the telephone line L when it has controlled the communication MODEM portion 210 so as to do off-hook communication, a so-called dialer function. It is possible to request the information delivery system II to deliver the remote-controller build-up data Drc of various audio/video instruments 110 etc. It is to be noted that a keying portion 215 is connected to the control portion 200 in FIG. 4. The keying portion 215 is provided with power-ON/OFF keys and a variety of setting keys. The ON/OFF key is used to turn on/off the main power supply of the base station 101. The setting keys are used to enter various settings. The keying portion 215 outputs to the RAM203, for example, the key data D12 based on these key operations.

In such a manner, the base station 101 can receive the TV broadcast signal Si, select its channel to demodulate it, perform data compression on the TV broadcast program signal Sa as demodulated, and wirelessly transmit it in accordance with a predetermined communication protocol. Further, it can receive network information such as the remote-controller build-up data Drc provided through the telephone line, demodulate it, perform data compression on it as in the case of the TV broadcast signal Si, and wirelessly transmit it in accordance with a predetermined communication protocol.

Further, the base station 101 can receive instruction information such as a channel-selection instruction and the remote-operation data D23 required to remote-operate an audio/video instrument, which are wirelessly transmitted from the display unit 102, which will be described later, to perform processing in accordance with the information or transmit through the communication MODEM portion 210 the information such as an e-mail transmitted from the display unit 102.

[Display Unit]

The display unit 102 shown in FIG. 5 constitutes a portable-terminal display unit and is wirelessly connected with the above-mentioned base station 101. This display unit 102 has a remote-controller function as a user interface to remote-control an audio/video instrument 110 etc. The remote-controller function is build up based on the remote-controller build-up data Drc downloaded from the server 106. The display unit 102 has a control portion 300. The control portion 300 comprises a CPU301, an ROM302, an RAM303, and an EEPROM304. These CPU301, ROM302, RAM303, and EEPROM304 are mutually connected through a CPU bus 305. That is, the control portion 300 constitutes a microcomputer and controls the entire display unit.

Besides the control portion 300, a radio transmission/reception portion 122, a decompression-processing portion 123, a transmit-signal formation portion 128, a keying portion 329, and a touch panel 351 are connected to the CPU bus 305. The radio transmission/reception portion 122 comprises a shared portion 122K, a transmission-processing portion 122S, and a reception-processing portion 122R. The decompression-processing portion 123 is connected to an image-signal-processing portion 124 and an audio-signal-processing portion 126.

The ROM302 connected to the CPU bus 305 stores various processing programs to be executed on this display unit 102 and the data D21 necessary for information processing. The RAM303 is used as a working space mainly for various kinds of processing, for example, temporary storage of data obtained in various kinds of information processing. For example, the RAM303 stores the remote-controller build-up data Drc, the data D21, the key data D22, the remote-operation data 23, etc. The remote-operation data D23 is transferred from the display unit 102 to the base station 101.

The EEPROM304 is a so-called nonvolatile memory and does not lose information held in it even after its power supply is turned off, to hold information of, for example, various setting parameters, created or received e-mails, contents of chat (text data), etc. Besides text data etc., the EEPROM304 stores the remote-controller build-up data Drc delivered from the server 106. This remote-controller build-up data Drc is wirelessly transferred from the base station 101. Accordingly, it is also possible to easily store in the EEPROM304 the remote-controller build-up data Drc for a newly added audio/video instrument 110 etc.

In a case where a radio signal is received from the base station 101 in the present embodiment, the display unit 102 operates as follows. A radio signal compliant with a predetermined communication protocol from the base station 101 is received by a transmission/reception antenna 121 shown in FIG. 5 and supplied through the shared portion 122K to the reception-processing portion 122R. The reception-processing portion 122R performs processing, for example, demodulation of a signal Sin' input from the antenna 121 based on a control signal S21 and supplies a signal Sc obtained as a result of demodulation to the decompression-processing portion 123. The control signal S21 is supplied from the CPU301 to the reception-processing portion 122R.

As described above, the signal Sout (=Sin') wirelessly transmitted from the base station 101 has undergone data compression, so that the decompression-processing portion 123 of the display unit 102 decompresses the demodulated signal Sc based on a control signal S22 to restore an original signal. The control signal S22 is supplied from the CPU301 to the decompression-processing portion 123. If the restored signal is, for example, the TV broadcast program signal Sa, it is composed of an image signal Sv and an audio signal Sm. This image signal Sv is supplied to the image-signal-processing portion 124 and the audio signal Sm, to the audio-signal-processing portion 126.

The image-signal-processing portion 124 receives the image signal Sv from the decompression-processing portion 123 to form a display signal Sv' and supply it to the touch-panel type liquid crystal display portion 125, which is one example of display means. Accordingly, the liquid crystal display portion 125 displays an image based on the display signal Sv'. For example, a remote-operation screen is displayed which is based on the remote-controller build-up data Drc downloaded from the information delivery system II by the delivery requesting function of the base station 101. This remote-operation screen is used to realize remote-controller function.

On the other hand, the audio-signal-processing portion 126 receives the audio signal Sm from the decompression-processing portion 123 to form an audio output signal Sm' and supplies this audio output signal Sm' to a speaker 127. The speaker 127 produces sound based on the audio output signal Sm'.

In such a manner, the display unit 102 receives the signal Sin' containing, for example, a TV Broadcast program wirelessly transmitted from the base station 101 and reproduces the image signal Sv and the audio signal Sm from this received signal Sin' and outputs them. Accordingly, the user can watch an image and listen to sound etc. of the TV broadcast program. Besides this function, the display unit 102 activates the "remote-controller function" on the display screen of the liquid crystal display portion 125.

To activate the "remote-controller function" on this display screen, the keying portion 329 and the touch panel 351 which are shown in FIG. 5 are operated. The keying portion 329 is connected to the control portion 300. The keying portion 329 is provided with a power-ON/OFF key and various setting keys. The ON/OFF key is used to turn on/off the main power supply of the display unit 102. The setting keys are used to enter various settings. The keying portion 329 outputs, for example, the key data D22 based on these keying operations to the RAM303.

The touch panel 351 is operated to enter the remote-operation data D23 on the remote-operation screen. For example, if the user touches a remote-controller key on the remote-operation screen, the remote-operation data D23 is read from the EEPROM304 and temporarily recorded in the RAM303. Furthermore, the display unit 102 outputs from the RAM303 to the base station 101 the remote-operation data D23 obtained by this keying operation through the remote-controller keys on this remote-operation screen.

For example, the remote-operation data D23 is supplied to the transmit-signal formation portion 128. The transmit-signal formation portion 128 forms a transmit signal Se compliant with a predetermined communication protocol. In the present embodiment, based on a control signal S23, the transmit signal Se compliant with a protocol in accordance with the Institute of Electrical and Electronics Engineers (IEEE) standard 802.11 or its evolved protocol is formed from the remote-operation data D23. The control signal S123 is supplied from the CPU301 to the transmit-signal formation portion 128.

The transmit signal Se formed at the transmit-signal formation portion 128 is supplied to the transmission-processing portion 122S in the radio transmission/reception portion 122. The radio transmission/reception portion 122 has the shared portion 122K, the transmission-processing portion 122S, and the reception-processing portion 122R. The transmission-processing portion 122S modulates or amplifies the transmit signal Se in accordance with a control signal S24 from the control portion 300. The transmit signal Sout processed at the transmission-processing portion 1122S is wirelessly transmitted to the base station 101 through the shared portion 122K and the antenna 121.

When the user thus operates the touch panel 351 to touch the remote-controller keys on the remote-operation screen, the remote-operation data D23 is transmitted under the control of the CPU301 from the antenna 121 to the base station 101 in a radio wave through the transmission-processing portion 122S and the shared portion 122K. Besides, to make a request to the server 106 shown in FIG. 1 to deliver the remote-controller build-up data Drc or give an instruction for acquisition of an electronic program guide etc., based on this instruction, the CPU301 of the display unit 102 accesses a predetermined server 106 from the base station 101 in a radio wave from the base station 101 through the antenna 121 via the transmission-processing portion 122S and the shared portion 122K.

This request is transmitted from the antenna 118 of the base X station 101 to the CPU201 via the shared portion 117K and the reception-processing portion 117R. Then, the CPU201 controls the communication portion 212 so that it may be connected through the I/F circuit 211 to a predetermined ISP and, further from it, to the predetermined server 106 through the Internet 105 shown in FIG. 1. Then, from this server 106, information such as the remote-controller build-up data Drc is received. The CPU201, when having received the remote-controller build-up Drc etc. from this server 106 via the I/F circuit 211 and the communication portion 212, supplies it to the RAM203 so that it may be stored there once.

Furthermore, the CPU201 supplies the transmit-signal formation portion 116 with the remote-controller build-up data Drc etc. stored in the RAM203. The transmit-signal formation portion 116 causes the transmit signal Sab such as a remote-controller image signal to be formed. The transmit signal Sab formed by this transmit-signal formation portion 116 is input to the transmission-processing portion 117S. The transmission-processing portion 117S processes the transmit signal Sab and outputs the transmit signal Sout in a radio wave from the shared portion 117K to the display unit 102 via the antenna 118.

In the display unit 102, the radio wave is received via the transmission/reception antenna 121 from the base station 101 and supplied via the shared portion 122K and the reception-processing portion 122R to the decompression-processing portion 123. The decompression-processing portion 123 decompresses image data schematically representing a remote controller supplied from the reception-processing portion 122R and then stores it in the EEPROM304.

Furthermore, when the user operates the touch panel 351 to instruct for display of the remote controller, the CPU301 reads the remote-controller build-up data Drc stored in the EEPROM304 and supplies it to the decompression-processing portion 123. The decompression-processing portion 123 decompresses the remote-controller build-up data Drc based on the control signal S22. The decompression-processing portion 123 supplies the remote-controller build-up data Drc as decompressed to the image-signal-processing portion 124 where it performs predetermined processing on the data and then outputs it to the liquid crystal display portion 125. The liquid crystal display 125 displays an image that schematically represents the remote controller. It is to be noted that the display unit 102 can similarly receive data such as an electronic program guide that is delivered.

The following will describe a display example of a remote controller RM on the liquid crystal display portion 125. If the user selects, for example, "REMOTE CONTROLLER" on a window 20 shown in FIG. 6, an image that schematically represents the remote controller RM is displayed. The window 20 is a display screen on the liquid crystal display portion 125. In this remote-controller RM display example, in a condition where a video deck not shown is connected to the base station 101, its video image is watched on the display unit 102 while the video remote controller RM is displayed on its display screen.

According to the remote-controller RM display example shown in FIG. 6, the window 20 is provided on it with an upper-part display portion 21 and a lower-part display portion 22, in the upper-part display portion 21 of which a channel-name indicating icon K1 and a sound-volume indicating icon K2 are displayed. In the present embodiment, the icon K1 indicates "VIDEO". This is because video reproduction is selected in a condition where the video deck is connected to the base station 101. Besides "VIDEO", the icon K1 indicates "TV", "INTERNET", "MAIL", "ALBUM", etc. or "SETTING". The icon K2 is used to adjust a sound volume, which is indicated in a bar.

Further, in the lower-part display portion 22 are displayed a screen memo key K3, a picture-quality adjustment key K4, a sound-quality adjustment key K5, a sleep key K6, and a remote controller key K7. The screen memo key K3 is operated to stop the screen, thereby providing a still image. The picture-quality adjustment key K4 is operated to adjust a picture quality of a TV or video image quality. The sound-volume adjustment key K5 is operated to adjust a quality of TV or video sound.

The sleep key K6 is operated to set a time when power supply of the video deck connected to the base station 101 is to be automatically put on. For example, when the sleep key K6 is selected, a setting child screen is displayed in a motion-picture display area to indicate "30 MINUTES", "60 MINUTES", . . . as a candidate lapse of time in which the power supply is to be turned off so that the user may select and set any one of them. The remote-controller key K7 is operated to select "REMOTE CONTROLLER".

An area between the upper-part display portion 21 and the lower-part display portion 22 is a motion-picture display area, in which a video image sent out from the video deck connected to the base station 101, a moving landscape image of a sailing yacht in the present embodiment, is reproduced on the video deck and displayed on the liquid crystal display portion 125 of the display unit 125. The present embodiment provides a case where in the motion-picture display area, an image of the remote controller RM is displayed as superposed on the moving landscape image of the yacht. This remote-controller image is displayed in the motion-picture display area by selecting the remote-controller key K7 in the lower-part display portion 22. This remote controller RM is operated so as to remote-control the video deck connected to the base station 101.

Figure 7:
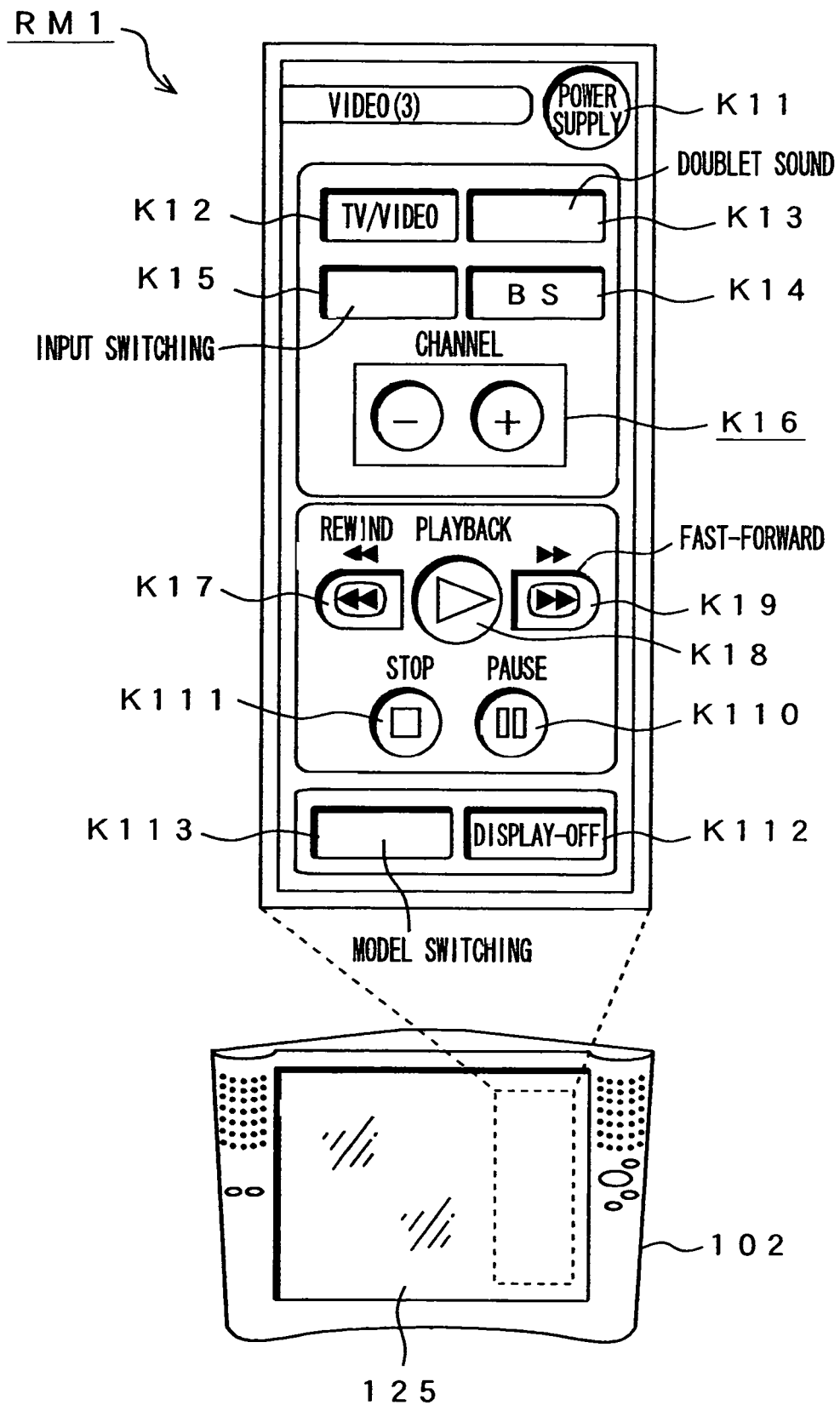
FIG. 7 shows a display example of a remote controller RM1 for video equipment on the LCD portion 125.

The following will describe a display example of a remote controller RM1 for video equipment. The remote controller RM1 shown in FIG. 7 is an image that schematically represents a remote controller on the display screen in the liquid crystal display portion 125 of the display unit 102. The remote controller RM1 comprises a power supply key K11, a TV/video key K12, a doublet sound key K13, a BS key K14, an input switching key K15, a channel −/+ key K16, a rewind key K17, a playback key K18, a fast-forward key K19, a pause key K110, a stop key K111, a display-off key K112, and a model switching key K113, images of which keys are displayed on the liquid crystal display portion 125.

The power supply key K11 is operated to turn on/off a power supply of the video deck. The TV/video key K12 is operated to switch between TV display and video display. The doublet sound key K13 is operated to switch sound multiplex broadcasting. The BS key K14 is operated to receive a satellite broadcast. The input switching key K15 is operated to switch an input to the video deck.

The channel −/+ key K16 is operated to increment/decrement a channel number respectively. The rewind key K17 is operated to rewind videotape. The playback key K18 is operated to reproduce a video. The fast-forward key K19 is operated to fast-forward a video. The pause key K110 is operated to pause a video. The stop key is operated to stop a video. The display-off key K112 is operated to erase display of the remote controller. The model switching key K113 is operated to switch between a first unit and a second unit of the video deck.

Figure 8:
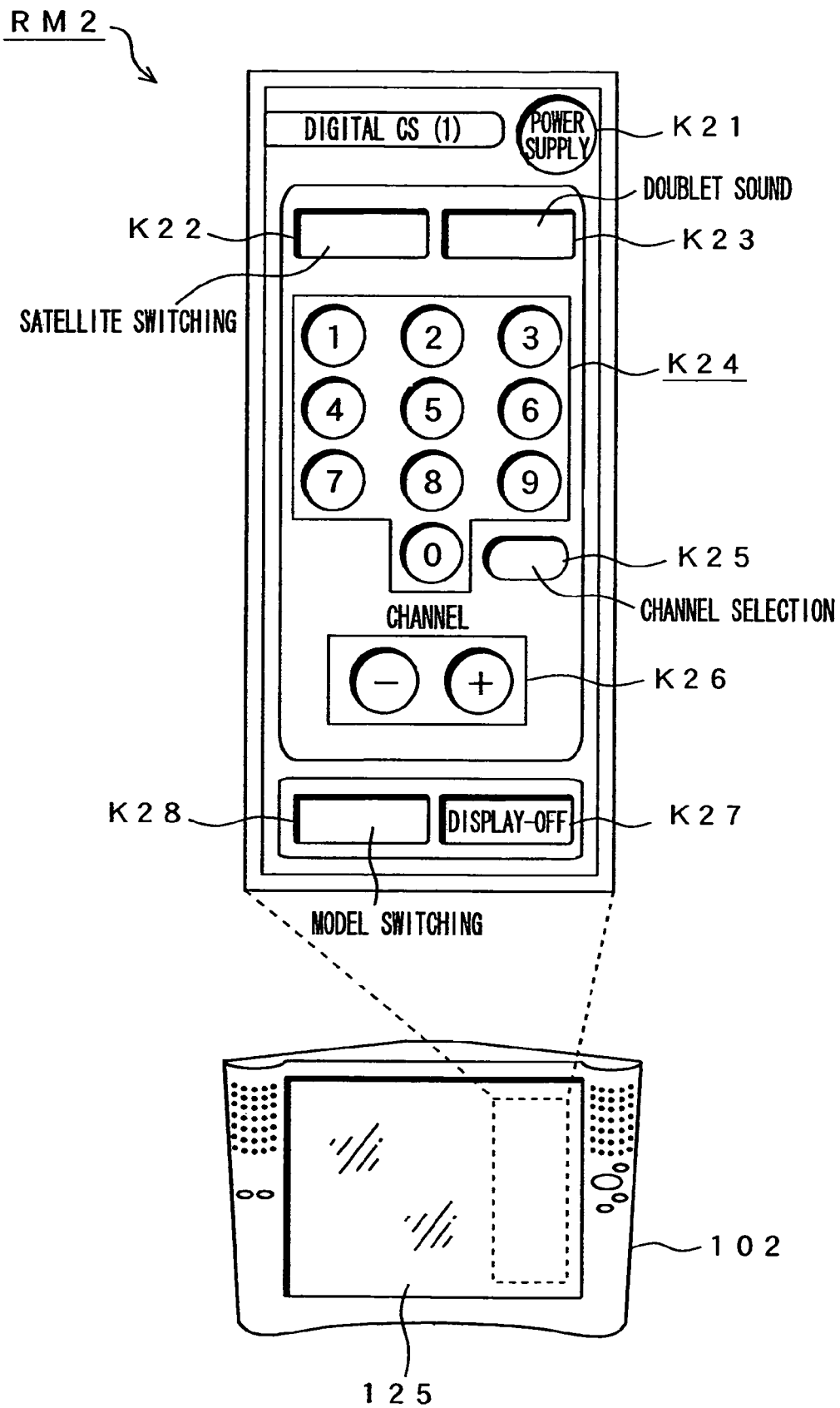
FIG. 8 shows a display example of a remote controller RM2 for digital CS equipment on the LCD portion 125.

The following will describe a display example of a remote controller RM2 for digital communication satellite (CS) equipment. The remote controller RM2 shown in FIG. 8 is an image that schematically represents a remote controller on the display screen in the liquid crystal display portion 125 of the display unit 102. The remote controller RM2 comprises a power supply key K21, a satellite switching key K22, a doublet sound key K23, a numeric keypad K24, a channel selection key K25, a channel −/+ key K26, a display-off key K27, and a model switching key K28, images of which keys are displayed on the liquid crystal display portion 125.

The power supply key K21 is operated to turn on/off a power supply of the digital CS equipment or a cable TV. The satellite switching key K22 is operated to switch a type of a satellite. The doublet sound key K23 is operated to switch sound multiplex broadcasting. The numeric keypad K24 is operated to enter a channel number. The channel selection key K25 is operated to enter a channel number after selecting this key bottom.

The channel −/+ key K26 is operated to increment/decrement a channel number of the digital CS or the cable TV, respectively. The display-off key K27 is operated to erase display of the remote controller. The model switching key K28 is operated to switch between a first unit and a second unit of the digital CS or the cable TV etc.

Figure 9:
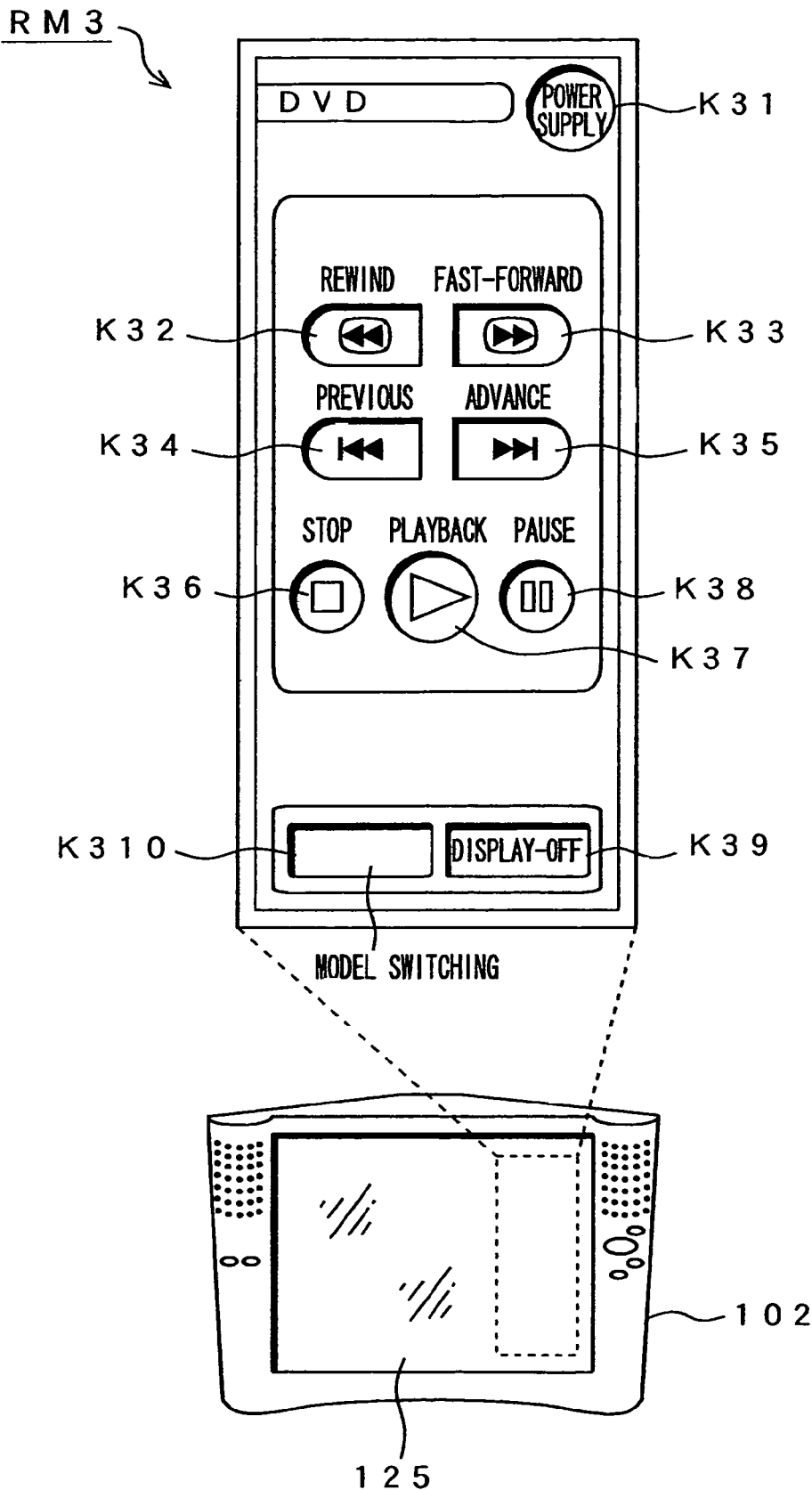
FIG. 9 shows a display example of a remote controller RM3 for DVD equipment on the LCD portion 125.

The following will describe a display example of a remote controller RM1 for digital versatile disc (DVD) equipment. The remote controller RM3 shown in FIG. 9 is an image that schematically represents a remote controller on the display screen in the liquid crystal display portion 125 of the display unit 102. The remote controller RM3 comprises a power supply key K31, a rewind key K32, a fast-forward key K33, a previous key K34, an advance key K35, a stop key K36, a playback key K37, a pause key K38, a display-off key K39, and a model switching key 310, images of which keys are displayed on the liquid crystal display portion 125.

The power supply key K31 is operated to turn on/off a power supply of the DVD equipment. The rewind key K32 is operated to rewind (double a speed of) a disc. The fast-forward key K33 is operated to fast-forward (double the speed of) the disc. The previous key K34 is operated to retract a chapter or image during reproduction of the DVD.

The advance key K35 is operated to provide a next chapter or image during reproduction of the DVD. The stop key is operated to stop the DVD. The playback key K37 is operated to reproduce the DVD. The pause key K38 is operated to pause the DVD. The display-off key K39 is operated to erase display of the remote controller. The model switching key K310 is operated to switch between a first unit and a second unit of the DVD equipment.

The following will describe an example of processing in the remote-controller build-up information-processing system 100. In the present embodiment, the information-processing apparatus 103 constituted of the base station 101 and the display unit 102 is provided and, for example, DVD equipment is connected as the audio/video instrument 110 to the base station 101, so that such a case is assumed that the remote-controller build-up data Drc in accordance with this DVD equipment is downloaded from the information delivery system II for remote control. In this system 100, three processing pieces are individually described: processing (at the time of delivery requesting) for making a request from the information-processing system I to the information delivery system II, processing (of remote-controller build-up information) for delivering of the remote-controller build-up data Drc from the information delivery system I to the information-processing system I, and processing (remote-operation processing) for remote-operating, for example, the DVD equipment by the information-processing system I based on the remote-controller build-up data Drc.

[Example of Processing at the Time of Delivery Requesting]

Figure 10:
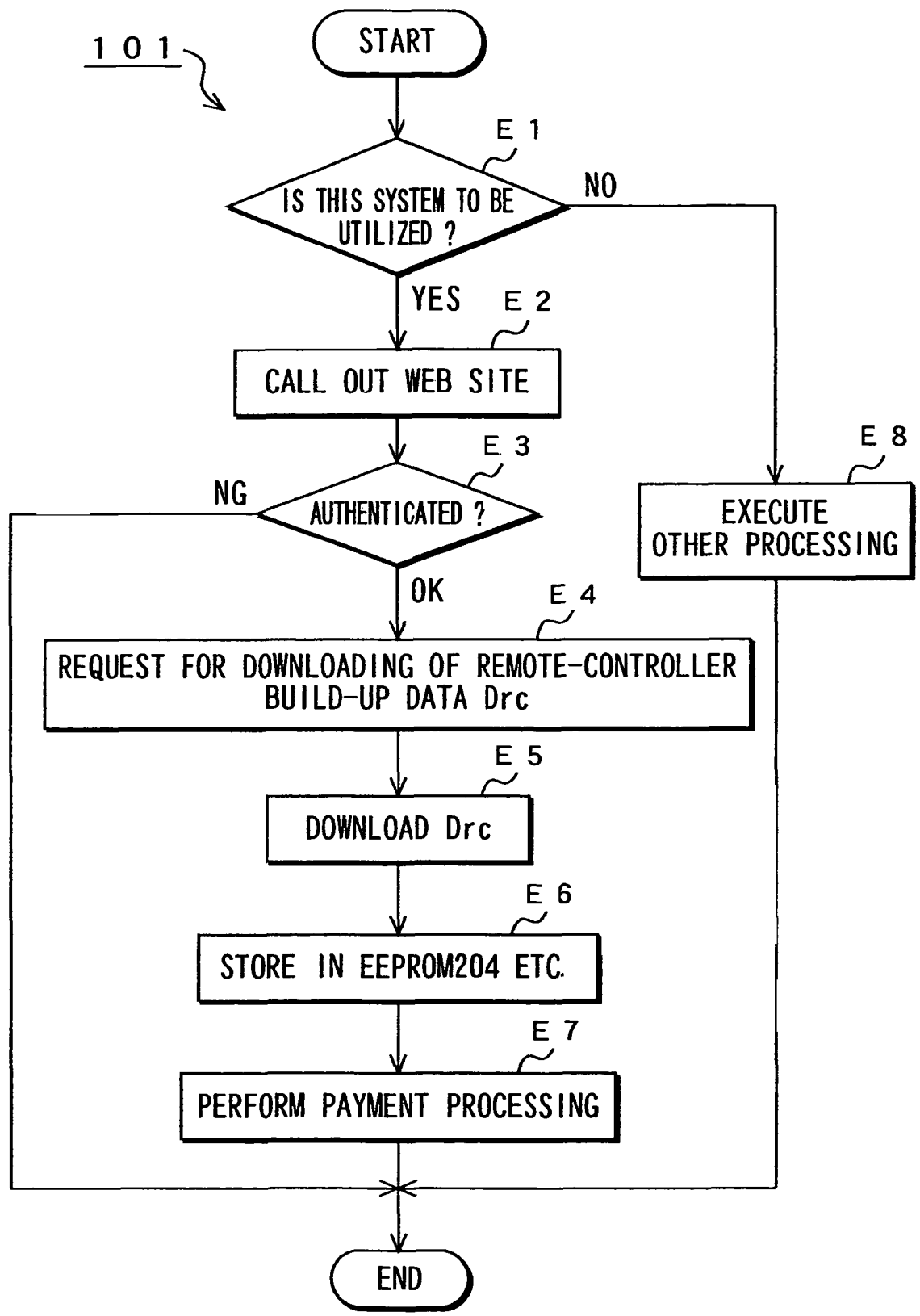
FIG. 10 is a flowchart for showing an example of processing at the time of delivery requesting in the information-processing system I.

In this example, in a case where the remote-controller build-up data Drc in accordance with DVD equipment is acquired in the information-processing system I, at step E1 of a flowchart shown in FIG. 10, it is checked whether the remote-controller build-up information-processing system 100 is to be utilized. Whether this system is to be utilized is decided by a user. If the remote-controller build-up information-processing system 100 is to be utilized, the process goes to step E2 where a predetermined Web site is called out to connect this base station 101 and the server 106 to ID each other through, for example, the Internet 105. In such a manner, the information delivery system II for delivering the remote-controller build-up data Drc and the information-processing system I provided with the base station 101 are connected to each other through the Internet 105.

Then, at step E3, a known authenticating method is used to authenticate a user ID etc. By this authentication processing, for example, individual's information (registered number) that identifies the user registered at an information provider beforehand and individual's information (registered number) input on the display unit 102 are compared with each other. If these two registered numbers agree, he or she is authenticated positive. If they do not agree, he or she is authenticated negative. In the case of the positive authentication, the process goes to step E4 to request the server 106 to download the remote-controller build-up data Drc in accordance with this DVD equipment. In this case, preferably an identification number of the DVD equipment can be collated. By this collation, the DVD equipment can be authenticated.

In accordance with this request for downloading, the remote-controller build-up data Drc is downloaded at step E5. The remote-controller build-up data Drc thus downloaded is stored in the EEPROM204 at step E6. In a case where a new unit of DVD equipment is added, its remote-controller build-up data Drc is further downloaded and recorded in the EEPROM204 additionally.

At step E7, the user performs payment processing. This payment processing is performed to automatically withdraw a fee from a bank account of the user by the server 16, which individually manages accounting services. In a case where it is decided at step E1 that the remote-controller build-up information-processing system 100 is not utilized, the process goes to step E8 to execute other processing. This is because such a case may be considered that the remote-controller build-up information system 100 is not utilized. When this another processing is finished or the user is authenticated negative at step E3, the information processing ends here.

[Example of Processing at the Time of Delivery of Remote-Controller Build-Up Data]

Figure 11:
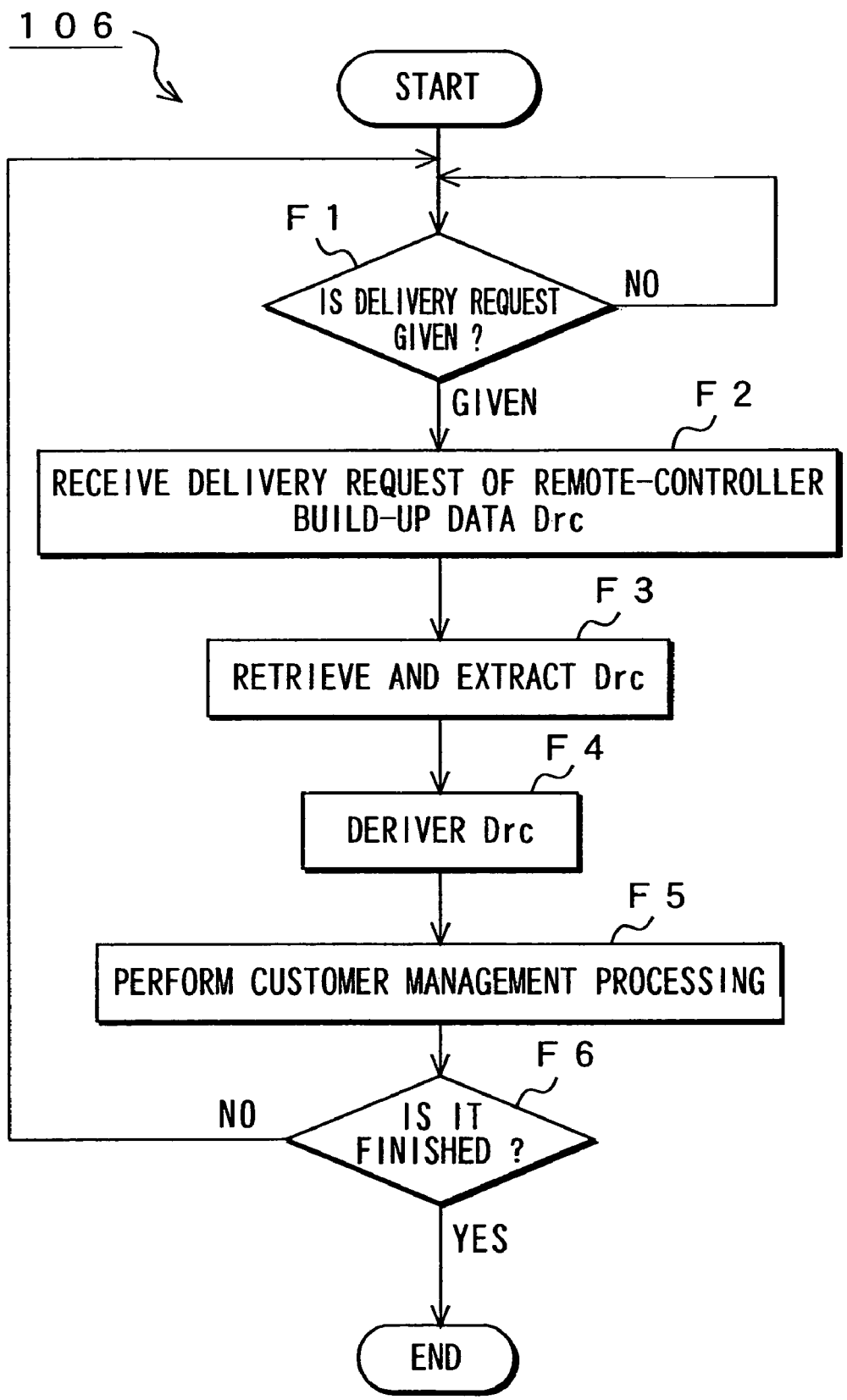
FIG. 11 is a flowchart for showing an example of processing at the time of delivery of remote-controller build-up data in the information-processing system II.

The information delivery system II waits for a request being made for delivery of the remote-controller build-up data Drc at step F1 of a flowchart shown in FIG. 11. If this delivery request is made, the process goes to step F2 to receive the request for delivery of the remote-controller build-up data Drc. Then, at step F3, the information delivery system II retrieves the database 107 to extract the remote-controller build-up data Drc of a DVD equipment unit on which the delivery request has been issued.

At step F4, the remote-controller build-up data Drc is delivered to the information-processing system I, which has issued the delivery request. Then, at step F5, the information delivery system II performs customer management processing concerning this delivery service. In this case, the server 106 individually manages services for delivering the remote-controller build-up data Drc provided to the information-processing system I as a target. For example, the server 106 performs account processing in response to payment for this delivery service. Further, the server 106 knows a model etc. of DVD equipment the user purchased, from the request for delivery of the remote-controller build-up data Drc. The purpose thereof is to develop potential popular goods in the future and improve delivery services of the remote controller build-up data Drc.

Then, at step F6, the information delivery system II checks on whether this processing should end. If this service is to last for 24 hours, the process return to step F1 where the information delivery system II repeats the above processing. If this delivery service is to be provided only in a limited lapse of time of the day, the information delivery system II ends this service processing when the service time expires.

[Example of Processing at the Time of Remote Operation]

This processing example is based on the assumption that the base station 101 and DVD equipment are connected to each other and the remote-operation screen is displayed on the portable-terminal type display unit 102 separated from the base station 101. Under these information processing conditions, when the information-processing system I remote-controls the DVD equipment, at step G1 of a flowchart shown in FIG. 12A, it is checked on whether the DVD equipment is to be remote-controlled. This check is conducted by the user. If the user remote-controls the DVD equipment, the process goes to step G2 to display the operation screen shown in FIG. 6 on the liquid crystal display portion 125. In this case, images of the keys are displayed in the upper-part display portion 21 and the lower-part display portion 22 except the motion-picture display area 23.

Then, the user touches the remote-controller key K7 to select the operation screen. By this selection, for example, the remote-controller build-up data Drc is read from the EEPROM204 and wirelessly transferred from the base station 101 to the display unit 102 at step G3. The remote-controller build-up data Drc is stored in the EEPROM304. From this EEPROM304, the remote-controller build-up data Drc is read, to cause an image that schematically represents a remote controller, which is one example of the remote-operation screen, to be displayed at, for example, a right end of the motion-picture display area 23 of the liquid crystal display portion 125 at step G4. In this example, an image that schematically represents the remote controller M3 shown in FIG. 9 is displayed.

Then, at step G5, the display unit 102 waits for an input operation being performed on the remote controller. In this case, the user operates the touch panel 351 on the operation screen of the remote controller, to input the remote-operation data D23. Therefore, if an input operation on the remote controller is detected at step G6, this remote-operation data D23 is read from the EEPROM204. Then, at step G7, the remote-operation data D23 is output from the display unit 102 to the base station 101.

Figure 12A:
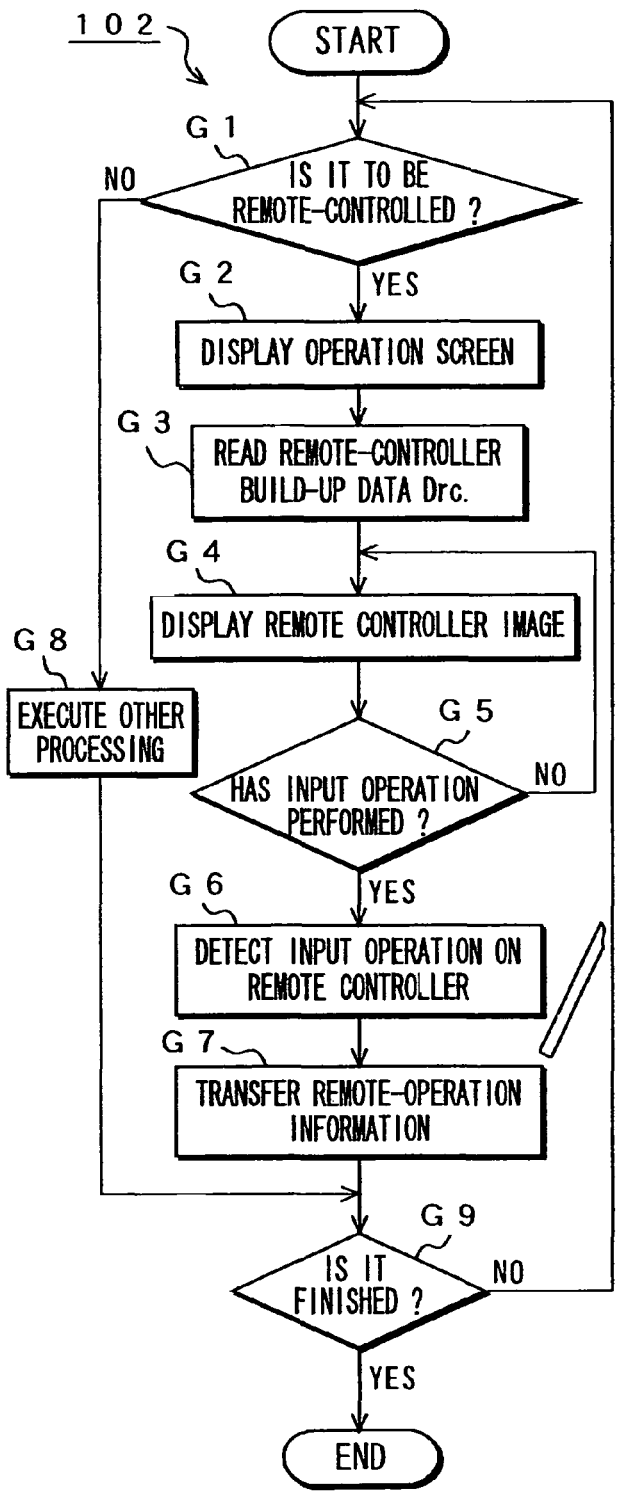
FIG. 12A is a flowchart for showing an example of processing at the time of remote operation the display unit 102 in the information-processing system I.
Figure 12B:
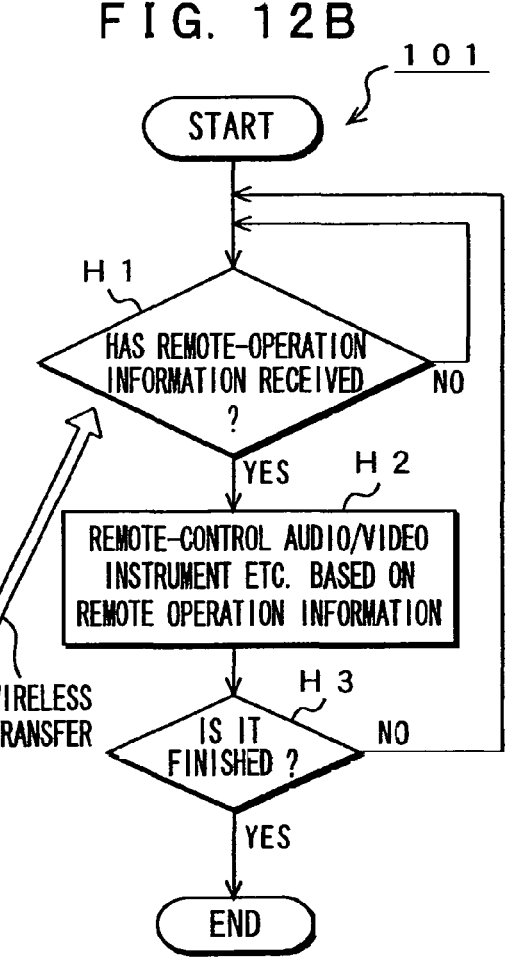
FIG. 12B is a flowchart for showing an example of processing at the time of remote operation in the base station 101 of the information-processing system I.

The base station 101, on the other hand, waits for inputting of the remote-operation data D23 from the display unit 102 at step H1 of a flowchart shown in FIG. 12B. When the remote-operation data D23 is input from the display unit 102, the process goes to step H2 where the base station 101 remote-controls the DVD equipment based on the remote-operation data D23 received from the display unit 102. Now, the DVD equipment can be controlled by the display unit 102.

For example, as shown in FIG. 9, when the power supply key K31 on the remote controller RM3 is turned on, the power supply of the DVD equipment is turned on. To reproduce a DVD, the playback key K37 is operated. Further, to fast-forward (double the speed of) the disc, the fast-forward key K33 is operated. To perform chapter processing or retract an image when the DVD is being reproduced, the previous key K34 is operated.

Further, to rewind (double the speed of) the disc, the rewind key K32 is operated. To pause the DID, the pause key K38 is operated. To perform chapter processing or advance an image when the DVD is being reproduced, the advance key K35 is operated. Further, to stop the DVD, the stop key K36 is operated. To erase display of the remote controller, the display-off key K39 is operated.

It is to be noted that if it is decided at step G1 of the flowchart of FIG. 12A that the DVD equipment is not to be remote-controlled, the process goes to step G8 to execute other processing. This is because there is a case where information such as chat or an electronic program guide is processed. Therefore, if the other processing is finished or the remote-operation data D23 is transferred to the base station 101 at step G7, the process goes to step G9. At step G9, the CPU301 decides whether this information processing is finished. Whether the information processing is finished is decided by detecting power-off information etc. If the power-off information is not detected, the process returns to step G1 to continue the above processing.

In such a manner, by the information-processing apparatus 103 according to the embodiment of the present invention, in a case where arbitrary DVD equipment is remote-controlled by receiving from the information delivery system II the remote-controller build-up data Drc in accordance with this DVD equipment, if the control unit 200 of the base station 101 is used to request the information delivery system II to deliver the remote-controller build-up data Drc in accordance with this DVD equipment, the remote-operation screen is displayed on the liquid crystal display portion 125 of the display unit 102 based on the remote-controller build-up data Drc received from the information delivery system II owing to the delivery requesting function of the control portion 200. Based on the remote-operation data D23 input by operations on the remote-operation screen displayed on the liquid crystal display portion 125 of the display unit 102, the base station 101 remote-controls the DVD equipment.

Therefore, it is also possible to easily acquire from the server 106 the remote-controller build-up data Drc in accordance with a newly added DVD equipment unit. It is thus possible to remote-control even a newly added DVD equipment unit based on the remote-operation data D23 input on the remote-operation screen. Therefore, a remote-controller system can be built up which can centrally remote-operate a plurality of DVD equipment units in a house etc. using the information-processing apparatus 103 constituted of the base station 101 and the display unit 102.

By realizing such a remote-controller delivery service system, audio/video instruments 110 etc. can be mutually connected and controlled. It is possible to easily realize inter-instrument synergy remote control in a house by utilizing the Internet environment.

INDUSTRIAL APPLICABILITY

The present invention is extremely well applicable to a multi-functional remote-controller service system etc. for delivering remote-operation control information in accordance with audio/video instruments such as a digital CS/BS tuner, a DVD player, or a CD/MD player and a variety of electronic instruments such as an air conditioner or a cooler.

The invention claimed is:

1. A base station connected to video information providing apparatus that is remote-controlled from the base station,
the base station wirelessly transmitting video content information supplied from the video information providing apparatus to touch-panel video display apparatus that is remote from said base station, the video display apparatus being of the type (a) to display the transmitted video content information and (b) to request downloading of a remote-controller user interface from an external data base and (c) to store remote-control build up data associated with said video information providing apparatus for controlling plural functions of said video information providing apparatus,
said base station receiving and storing in a non-volatile memory remote-controller user interface information included in said remote-control build-up data downloaded from said external data base and for wirelessly transmitting, in response to user operation of said touch-panel video display apparatus, the remote-controller user interface information stored in said non-volatile memory for displaying on said touch-panel video display apparatus a remote- controller user interface that displays the image of a user-operated touch-panel remote control unit downloaded from said external data base and associated with said video information providing apparatus, said image of said touch-panel remote control unit including touch-sensitive button images on said display, to select and control the operating functions of said video information providing apparatus, so as to produce remote-operation information at said base station in response to operations on said user interface by a user operating the touch-sensitive button images;
said base station comprising:
said non-volatile memory for storing the downloaded remote-control build-up data from said external data base;

a receiver unit for wirelessly receiving remote-control information from said video display apparatus, generated by user operations on the touch-sensitive button images, to produce said remote-operation information that controls the operating functions of the video information providing apparatus that is connected to said base station;

a remote-control unit for remotely controlling said video information providing apparatus in response to said remote-control information received from said video display apparatus;

a video information reception unit for wirelessly receiving video content information from said video information providing apparatus controlled by said remote-control information; and a transmitter unit for wirelessly transmitting both said video content information received from said video information providing apparatus and said downloaded user interface information stored in said non-volatile memory to said video display apparatus for storing at said video display apparatus the same user interface information that is stored in said non-volatile memory, and for displaying on said video display apparatus both video content from said video information providing apparatus and said image of the user-operated touch panel remote control unit superposed on said video content; and whereby said base station controls the operating functions of the video information providing apparatus directly.

2. A method by which a base station wirelessly transmits video content information supplied from video information providing apparatus, the video information providing apparatus being remote-controlled from the base station, to touch-panel video display apparatus that is remote from said base station, the video display apparatus being of the type (a) to display the transmitted video content information and (b) to request downloading of a remote-controller user interface from an external data base and (c) to store remote-control build up data associated with said video information providing apparatus for controlling plural functions of said video information providing apparatus, said base station receiving and storing in a non-volatile memory remote-controller user interface information included in said remote-control build-up data downloaded from said external data base and for wirelessly transmitting, in response to user operation of said touch-panel video display apparatus, the remote-controller user interface information stored in said non-volatile memory for displaying on said touch-panel video display apparatus a remote-controller user interface that displays the image of a user-operated touch-panel remote control unit downloaded from said external data base and associated with said video information providing apparatus, said image of said touch-panel remote control unit including touch-sensitive button images on said display, to select and control the operating functions of said video information providing apparatus so as to produce remote-operation information at said base station in response to operations on said user interface by a user operating the touch-sensitive button images;

said method comprising the steps of:

storing in a non-volatile memory in said base station the downloaded remote-control build-up data from said external data base;

wirelessly receiving at the base station remote-control information from said video display apparatus, generated by user operations on the touch-sensitive button images, to produce said remote-operation information that controls the operating functions of the video information providing apparatus that is connected to said base station;

remotely controlling said video information providing apparatus in response to said remote-control information received from said video display apparatus;

wirelessly receiving video content information from said video information providing apparatus controlled by said remote-control information; and wirelessly transmitting both said video content information received from said video information providing apparatus and said downloaded user interface information stored in said non-volatile memory to said video display apparatus for storing at said video display apparatus the same user interface information that is stored in said non-volatile memory, and for displaying on said video display apparatus both video content from said video information providing apparatus and said image of the user-operated touch panel remote control unit superposed on said video content; and whereby said base station controls the operating functions of the video information providing apparatus directly.

3. A non-transitory computer-readable record medium for storing a program operable to control a processor to carry out the method by which a base station wirelessly transmits video content information supplied from video information providing apparatus, the video information providing apparatus being remote-controlled from the base station, to touch-panel video display apparatus that is remote from said base station, the video display apparatus being of the type (a) to display the transmitted video content information and (b) to request downloading of a remote-controller user interface from an external data base and (c) to store remote-control build up data associated with said video information providing apparatus for controlling plural functions of said video information providing apparatus, said base station receiving and storing in a non-volatile memory remote-controller user interface information included in said remote-control build-up data downloaded from said external data base and for wirelessly transmitting, in response to user operation of said touch-panel video display apparatus, the remote-controller user interface information stored in said non-volatile memory for displaying on said touch-panel video display apparatus a remote-controller user interface that displays the image of a user-operated touch-panel remote control unit downloaded from said external data base and associated with said video information providing apparatus, said image of said touch-panel remote control unit including touch-sensitive button images on said display, to select and control the operating functions of said video information providing apparatus so as to produce remote-operation information at said base station in response to operations on said user interface by a user operating the touch-sensitive button images;

said program implementing the steps of:

storing in a non-volatile memory in said base station the downloaded remote-control build-up data from said external data base;

wirelessly receiving at the base station remote-control information from said video display apparatus, generated by user operations on the touch-sensitive button images , to produce said remote-operation information that controls the operating functions of the video information providing apparatus that is connected to said base station;

remotely controlling said video information providing apparatus in response to said remote-control information received from said video display apparatus;

wirelessly receiving video content information from said video information providing apparatus controlled by said remote-control information; and wirelessly transmitting both said video content information received from said video information providing apparatus and said downloaded user interface information stored in said non-volatile memory to said video display apparatus for storing at said video display apparatus the same user interface information that is stored in said non-volatile memory, and for displaying on said video display apparatus both video content from said video information providing apparatus and said image of the user-operated touch panel remote control unit superposed on said video content; and whereby said base station controls the operating functions of the video information providing apparatus directly.

* * * * *